(12) United States Patent
Amirkhany et al.

(10) Patent No.: US 7,133,463 B1
(45) Date of Patent: Nov. 7, 2006

(54) LINEAR TRANSFORMATION CIRCUITS

(75) Inventors: Amir Amirkhany, Stanford, CA (US); Vladimir Stojanovic, Lexington, MA (US); Elad Alon, Saratoga, CA (US); Jared LeVan Zerbe, Woodside, CA (US); Mark A. Horowitz, Menlo Park, CA (US)

(73) Assignee: Rambus Inc., Los Altos, CA (US)

( * ) Notice: Subject to any disclaimer, the term of this patent is extended or adjusted under 35 U.S.C. 154(b) by 0 days.

(21) Appl. No.: 11/213,352

(22) Filed: Aug. 25, 2005

(51) Int. Cl.
*H04L 27/04* (2006.01)

(52) U.S. Cl. .................... 375/295; 375/261; 375/298; 370/210; 370/366; 370/419; 370/535

(58) Field of Classification Search ................ 370/210, 370/366, 419, 535; 375/261, 295, 298
See application file for complete search history.

(56) References Cited

U.S. PATENT DOCUMENTS

| | | | | |
|---|---|---|---|---|
| 5,757,766 A * | 5/1998 | Sugita | ..................... | 370/206 |
| 6,310,926 B1 * | 10/2001 | Tore | ..................... | 375/355 |
| 6,320,901 B1 * | 11/2001 | Arad et al. | ................. | 375/222 |
| 6,611,551 B1 * | 8/2003 | Jones et al. | ................. | 375/219 |
| 6,785,349 B1 * | 8/2004 | Rosenlof et al. | ............ | 375/343 |
| 6,954,505 B1 * | 10/2005 | Gatherer et al. | ............ | 375/260 |
| 7,020,218 B1 * | 3/2006 | Arnesen | ..................... | 375/316 |
| 2002/0075907 A1 * | 6/2002 | Cangiani et al. | ............ | 370/535 |
| 2003/0012297 A1 * | 1/2003 | Imamura | ..................... | 375/295 |
| 2003/0218973 A1 * | 11/2003 | Oprea et al. | ................. | 370/210 |
| 2003/0231581 A1 * | 12/2003 | Son | ............................. | 370/208 |

\* cited by examiner

*Primary Examiner*—Rexford Barnie
*Assistant Examiner*—Khai Nguyen
(74) *Attorney, Agent, or Firm*—Morgan, Lewis & Bockius LLP

(57) ABSTRACT

A transform circuit includes a first circuit and a second circuit. The first circuit and the second circuit implement first and second mappings that together generate a pre-defined transform of N digital data symbols. The first circuit maps a set of N digital data symbols from N parallel data streams to N analog data symbols by generating N sets of weighted sums of the N digital data symbols. Each respective weighted sum is defined by a respective set of pre-determined weighting values in a first matrix. The second circuit maps the N analog data symbols to a sequence of N output signals over N time intervals. Each of the N output signals corresponds to a respective weighted sum of the N analog data symbols. Each respective weighted sum is defined by a respective set of pre-determined weighting values in a second matrix.

21 Claims, 17 Drawing Sheets

Mapping a Set of N Digital Data Symbols From N Parallel Data Streams to N Analog Data Symbols by Generating N Sets of Weighted Sums of the N Digital Data Symbols, Each Respective Weighted Sum Defined by a Respective Set of Pre-determined Weighting Values in a First Matrix
1210

Mapping the N Analog Data Symbols to a Sequence of N Output Signals Over N Time Intervals, Each of the N Output Signals Corresponding to a Respective Weighted Sum of the N Analog Data Symbols, Each Respective Weighted Sum Defined by a Respective Set of Pre-determined Weighting Values in a Second Matrix
1212

Fig. 12

LINEAR TRANSFORMATION CIRCUITS

FIELD OF THE INVENTION

The present invention relates generally to systems having circuits for implementing a linear transformation.

BACKGROUND

Many systems have circuit implementations of a linear transformation, such as discrete Fourier transform (DFT) and/or an inverse discrete Fourier transform (IDFT). For example, communications systems that utilize multi-tone links often implement the IDFT during transmission of data and the DFT during receiving of the data. These transformations are useful in getting close to capacity from the communication channel.

The DFT and/or the IDFT are often implemented using digital circuits. This is illustrated in an existing communication system 100 shown in FIG. 1. A transmitter 110 includes an IDFT 112 and a digital-to-analog (D/A) converter 116. The IDFT 112 and the D/A converter 116 each may be clocked at a rate that is at least at the Nyquist rate (two times the symbol rate) using clock 114. A receiver 118 includes an analog-to-digital (A/D) converter 120 and a DFT 122. The A/D converter 120 and the DFT 122 each may be clocked at least at the Nyquist rate using clock 124. At high data rates, however, circuits, such as the transmitter 110 and the receiver 118, may have excessive sampling rates, i.e., high frequencies for the clocks 114 and 124, and resolution or quantization requirements. As a consequence, digital implementations of transformations such as the IDFT 112 and the DFT 122, may be complex, costly and may consume significant amounts of power. There is a need, therefore, for improved linear transformation circuits.

BRIEF DESCRIPTION OF THE DRAWINGS

For a better understanding of the invention, reference should be made to the following detailed description taken in conjunction with the accompanying drawings, in which:

FIG. 12 is a flow diagram illustrating a method of operation of a transform circuit.

Like reference numerals refer to corresponding parts throughout the drawings.

DETAILED DESCRIPTION OF EMBODIMENTS

Figure 1:
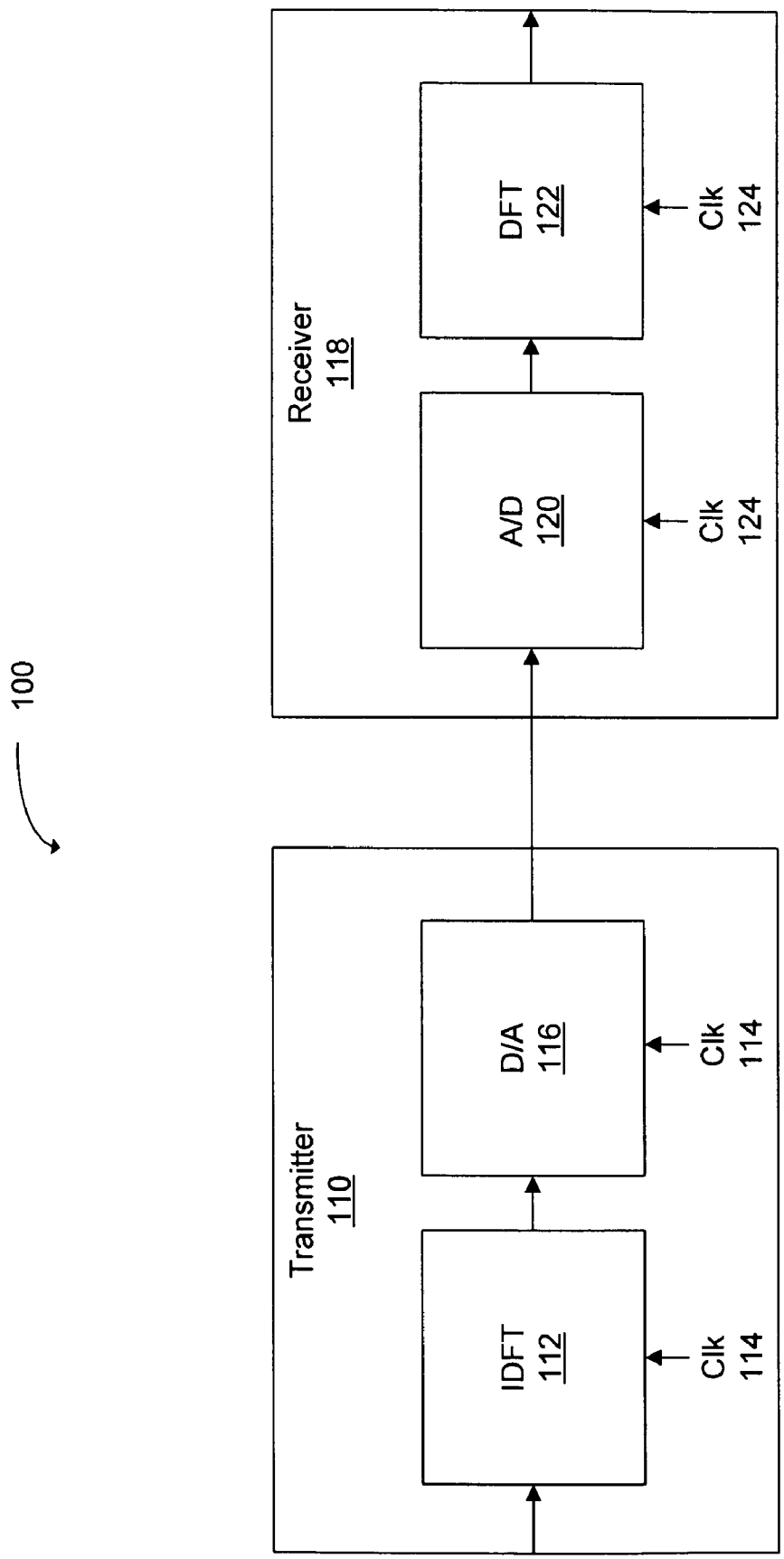
FIG. 1 is a block diagram illustrating an embodiment of an existing communications system.

A transform circuit includes a first circuit and a second circuit. The first circuit and the second circuit implement first and second mappings that together generate a pre-defined transform of N digital data symbols. The pre-defined transform may be an inverse discrete Fourier transform (IDFT).

The first circuit maps a set of N digital data symbols from N parallel data streams to N analog data symbols by generating N sets of weighted sums of the N digital data symbols. Each respective weighted sum is defined by a respective set of pre-determined weighting values in a first matrix. In some embodiments, the first circuit includes first and second parallel sub-circuits. Each sub-circuit includes a plurality of fixed gain drivers and connections for coupling a subset of the N digital data symbols to a respective set of the fixed gain drivers thereby multiplying the subset of the N digital data symbols by a corresponding subset of the pre-determined weighting values in the first matrix.

The second circuit maps the N analog data symbols to a sequence of N output signals over N time intervals. Each of the N output signals corresponds to a respective weighted sum of the N analog data symbols. Each respective weighted sum is defined by a respective set of pre-determined weighting values in a second matrix. The second circuit may include multiplier circuitry for multiplying the N analog data symbols by the second matrix of pre-determined weighting values. The multiplier circuitry may include circuitry for multiplying the N analog data symbols by successive respective subsets of the pre-determined weighting values during N successive time intervals to produce N successive sets of multiplication results. In some embodiments, at least one multiplier circuit modulates the N analog data symbols using a carrier signal having a respective carrier signal frequency. The second circuit may also include a summation circuit or node for combining each successive set of multiplication results from the second circuit to produce a respective output signal during each of the N successive time intervals.

In some embodiments, the digital data symbols are complex, having an in-phase component and an out-of-phase component. The first circuit may use multiplication in a complex domain to generate weighted sums of combinations of in-phase components and out-of-phase components of the N digital data symbols. The second circuit may use multiplication in a complex domain to generate weighted sums of combinations of in-phase components and out-of-phase components of the N analog data symbols.

In some embodiments, a summation of each row in the first matrix equals a first value and a summation of each column in the first matrix equals the first value. In some embodiments, the second matrix includes a plurality of complex values. Each complex value has a component selected from a first set of two distinct values of equal magnitude and/or a second set of two distinct values of equal magnitude.

The transform circuit may include a serial to parallel converter to process a first data stream to produce the N parallel data streams.

The transform circuit may include a finite state machine. In some embodiments, the first circuit includes a plurality of fixed gain drivers and a connection matrix controlled by the finite state machine controls multiplication of the N digital data symbols by respective pre-determined weighting values associated with the fixed gain drivers. In some embodiments, the first circuit includes N programmable gain drivers and the finite state machine provides respective pre-determined weighting values for multiplying the N digital data symbols. In some embodiments, the second circuit includes a plurality of fixed gain drivers and a connection matrix controlled by the finite state machine controls multiplication of the N analog data symbols by respective pre-determined weighting values associated with the fixed gain drivers. In some embodiments, the second circuit includes N programmable gain drivers and the finite state machine provides respective pre-determined weighting values for multiplying the N analog data symbols.

In some embodiments, a second transform circuit includes a third circuit, an integration circuit and a fourth circuit. The third circuit and the fourth circuit implement third and fourth mappings that together generate a pre-defined transform of N analog signals into N digital data symbols. The pre-defined transform may be a discrete Fourier transform (DFT).

The third circuit maps the N analog signals to N sequences of N analog data symbols over N time intervals. Each of the N sequences of N analog data symbols corresponds to a respective weighted sum of a respective set of analog signals. Each respective weighted sum is defined by a respective set of pre-determined weighting values in the third matrix.

The integration circuit integrates each of the N sequences of N analog data symbols for N time intervals producing N integrated sequences.

The fourth circuit maps the N integrated sequences to the N digital data symbols by generating a set of weighted sums of the N integrated sequences. Each respective weighted sum is defined by a respective set of pre-determined weighting values in the fourth matrix.

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, and circuits have not been described in detail so as not to unnecessarily obscure aspects of the embodiments.

The linear transformation approach described below, including embodiments of circuits, implement transformations, such as the DFT and the IDFT, by decomposing a respective transformation into two stages. One stage operates primarily in the digital domain at a sampling rate lower than a Nyquist sampling rate and the other stage operates primarily in the analog domain at a data rate corresponding to the Nyquist sampling rate. The implementation of the respective transformation in two stages does not incur a loss of performance. In addition, the implementation takes advantage of the ability to perform certain operations in high-speed analog circuits. The resulting circuits reduce complexity, cost and power consumption.

Figure 2A:
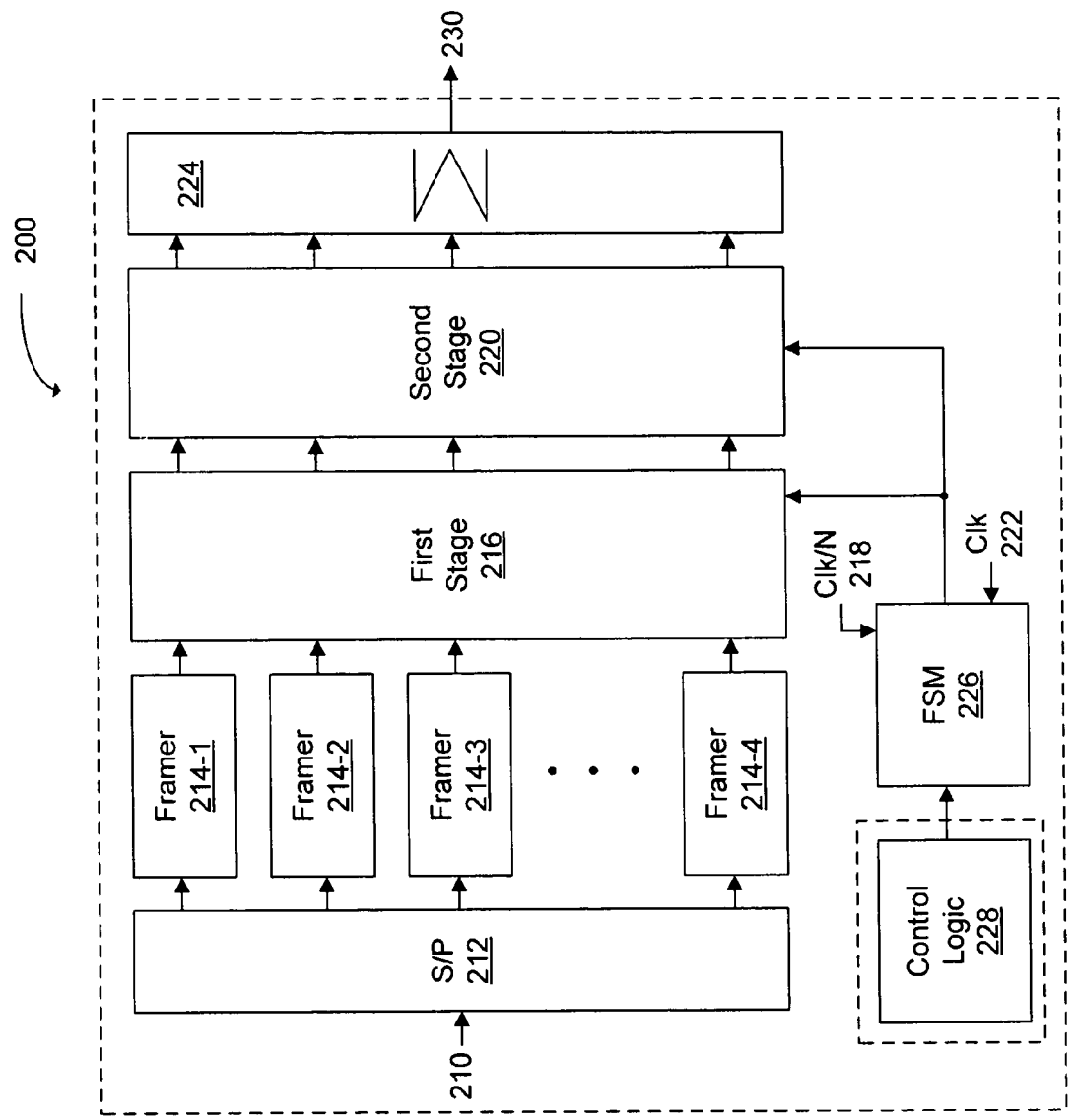
FIG. 2A is a block diagram illustrating an embodiment of a transform circuit.

FIG. 2A illustrates an embodiment of a transform circuit 200. The transform circuit 200 may be used in a transmitter in a communications system. The transform circuit 200 includes a first stage circuit 216 and a second stage circuit 220. The first stage circuit 216 and the second stage circuit 220 implement first and second mappings that correspond to a first and second matrix decomposition of a pre-defined transformation. The first and second mappings together generate the pre-defined transformation of N digital data symbols. In exemplary embodiments, N is 2, 4, 8, 16, 32, 64, 128, 256, 512 or 1024. In some embodiments, N is greater than 3.

In the transform circuit 200, a data stream 210 including digital data symbols is coupled to a serial-to-parallel (S/P) converter 212. The S/P converter 212 may output N parallel data streams to optional framer circuits 214. The framer circuits 214 may add cyclic padding to the N parallel data streams as is known in the art. In alternate embodiments, cyclic padding may be implemented by cyclically repeating operations performed by the second stage circuit 220 on outputs from the first stage circuit 216.

The N parallel data streams are coupled to the first stage circuit 216. The first stage circuit 216 maps a set of N digital data symbols from the N parallel data streams to N analog data symbols by generating N sets of weighted sums of the N digital data symbols. Each respective weighted sum is defined by a respective set of pre-determined weighting values in the first matrix. In some embodiments, the weighting of sums may be implemented in the analog domain or in the digital domain and then converted to analog signals for input to the second stage circuit 220.

The N analog data symbols are coupled to the second stage circuit 220. The second stage circuit 220 maps the N analog data symbols to a sequence of N output signals over N second-stage time intervals. Each of the N output signals corresponds to a respective weighted sum of the N analog data symbols. Each respective weighted sum is defined by a respective set of pre-determined weighting values in a second matrix. The N output signals at each second-stage time interval in the N successive second-stage time intervals are coupled to summation circuit 224 to generate analog signal 230.

The first stage circuit 216 operates at a clock rate governed by clock Clk/N 218, i.e., at a rate N-times lower than clock Clk 222 that governs the rate of inputs to the second stage circuit 220. Therefore, each second-stage time interval in the N second-stage time intervals may correspond to a period of the clock Clk 222. In an exemplary embodiment, the clock Clk/N 218 is 2.5 GHz, i.e., N equals 4, and the clock Clk 222 is 10 GHz. In this example, the analog signal 230 includes transformations of 4 digital data symbols at a rate of 2.5 GHz. In some embodiments, the first stage circuit 216 may operate at a clock rate different than Clk/N 218.

The transform circuit 200 may include a finite state machine (FSM) 226 and/or control logic 228. The control logic 228 may be implemented in the transform circuit 200. Alternatively, the control logic 228 may be implemented outside of the transform circuit 200. The FSM 226 and/or the control logic 228 may provide control signals to the first stage circuit 216 and/or the second stage circuit 220. The control signals may configure, adjust and/or program the first mapping and/or the second mapping. In some embodiments, the control signals may be fixed over two or more second-stage time intervals.

In some embodiments, the transform circuit 200 may have fewer or more components. Functions of two or more components may be implemented in a single component.

Alternatively, functions of some components may be implemented in additional instances of the components. For example, in some embodiments there may be more than one FSM 226, more than one control logic 228 or one or more external interfaces. There may also be more than one instance of the transform circuit 200. Each instance of the transform circuit may be applied to a respective data stream, such as the data stream 210. In some embodiments, the clock Clk/N 218 may be input the first stage circuit 216 either in addition to or instead of the FSM 226. Similarly, the clock Clk 222 may be input the second stage circuit 220 either in addition to or instead of the FSM 226.

In some embodiments, additional instances of the transform circuit 200 may implement linear precoding of one or more data streams, such as data streams corresponding to one or more sub-channels in a multi-channel communications link. One or more instances of the transform circuit 200 may apply a different weight to respective data streams. In an alternate embodiment, the transform circuit 200 may include multiple instances of the first stage circuit 216. The multiple instances of the first stage circuit 216 may implement linear precoding of the one or more data streams.

In some embodiments, there may be two or more instances of the second stage circuit 220. Outputs from these two or more instances may be multiplexed to generate the analog signal 230. In some embodiments, each instance of the second stage circuit 220 may have an instance of the first stage circuit 216 driving it.

In order to modify a respective phase of the at least a subset of the digital data symbols, in some embodiments the transform circuit 200 may include a rotation circuit, such as a one or more-tap equalizer. In some embodiments, the equalizer may be complex, i.e., adjusting a magnitude and a phase.

In embodiments, where the data stream 210 corresponds to a passband sub-channel, such as in a multi-tone link, additional components after the transform circuit 200 may modulate the output signals from the second stage circuit 220. The modulation may heterodyne or modulate the information in the output signals to a band of frequencies corresponding to the passband sub-channel.

In some embodiments, the first stage circuit 216 may be fully digital, i.e., having digital inputs and digital outputs. Digital-to-analog converters (DACs) may operate at a fraction of a sampling rate to convert one or more outputs from the first stage circuit 216 to one or more analog signals that are input to the second stage circuit 220. In some embodiments, some or all of the first stage circuit 216 may be analog and/or some or all of the second stage circuit 220 may be digital. In some embodiments, the transform may be implemented using one or more additional stages or circuits. In some embodiments, the first stage circuit 216 and/or the second stage circuit 220 may be implemented in two or more stages.

Figure 3A:
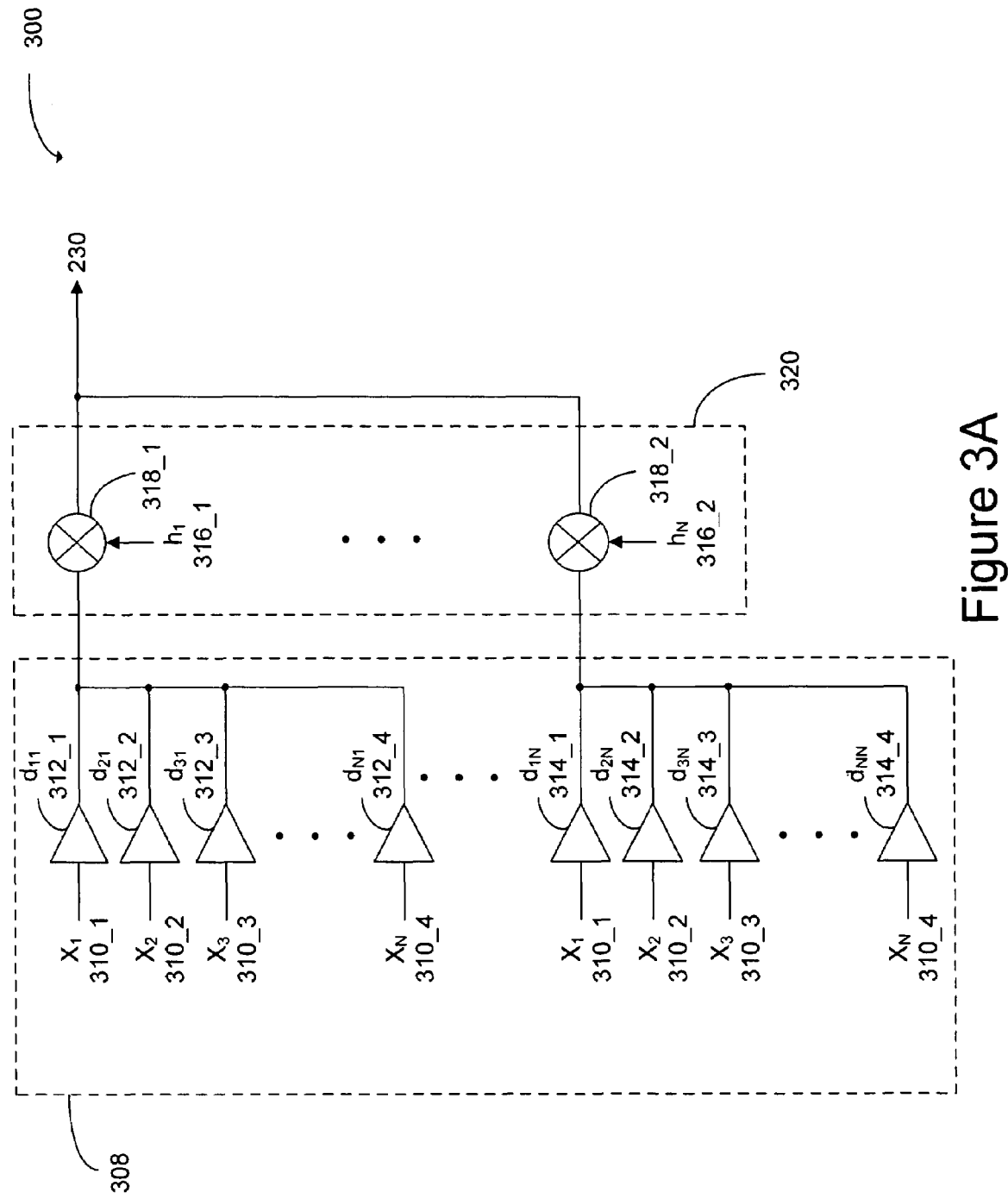
FIG. 3A is a block diagram illustrating an embodiment of a transform circuit.

FIG. 3A illustrates an embodiment of a transform circuit 300 including a first stage circuit 308 and a second stage circuit 320. The first stage circuit 308 maps the set of N digital data symbols from N parallel data streams 310 to the N analog data symbols by generating the N sets of weighted sums of the N digital data symbols. The N sets of weighted sums are generated using N parallel sub-circuits. Each sub-circuit includes N programmable gain drivers, such as adjustable gain drivers 312 and adjustable gain drivers 314. A pre-determined set of weighting or gain values during a first-stage time interval, corresponding to a period of the clock Clk/N 218 (FIG. 2A), may be provided by the FSM 226 (FIG. 2A) and/or the control logic 228 (FIG. 2A). When the gain of any of the adjustable gain drivers 312, 314 is zero, the zero-gain drivers may be omitted from the transform circuit, in which case the corresponding sub-circuit has fewer than N adjustable gain drivers.

The second stage circuit 320 maps the N analog data symbols to the sequence of N output signals over the N second-stage time intervals. Each of the N output signals corresponds to the respective weighted sum of the N analog data symbols. The second stage circuit 320 includes N programmable multipliers 318. The FSM 226 (FIG. 2A) and/or the control logic 228 (FIG. 2A) may provide respective pre-determined weighting values or gains 316 for modulating or multiplying the N analog data symbols during each second-stage time interval, corresponding to a period of the clock Clk 222 (FIG. 2A). Multiplication in each of the multipliers 318 by successive respective subsets of the pre-determined weighting values during N successive second-stage time intervals produce N successive sets of multiplication results. Multiplication results during each second-stage time interval may be summed to generate the analog signal 230.

Figure 3B:
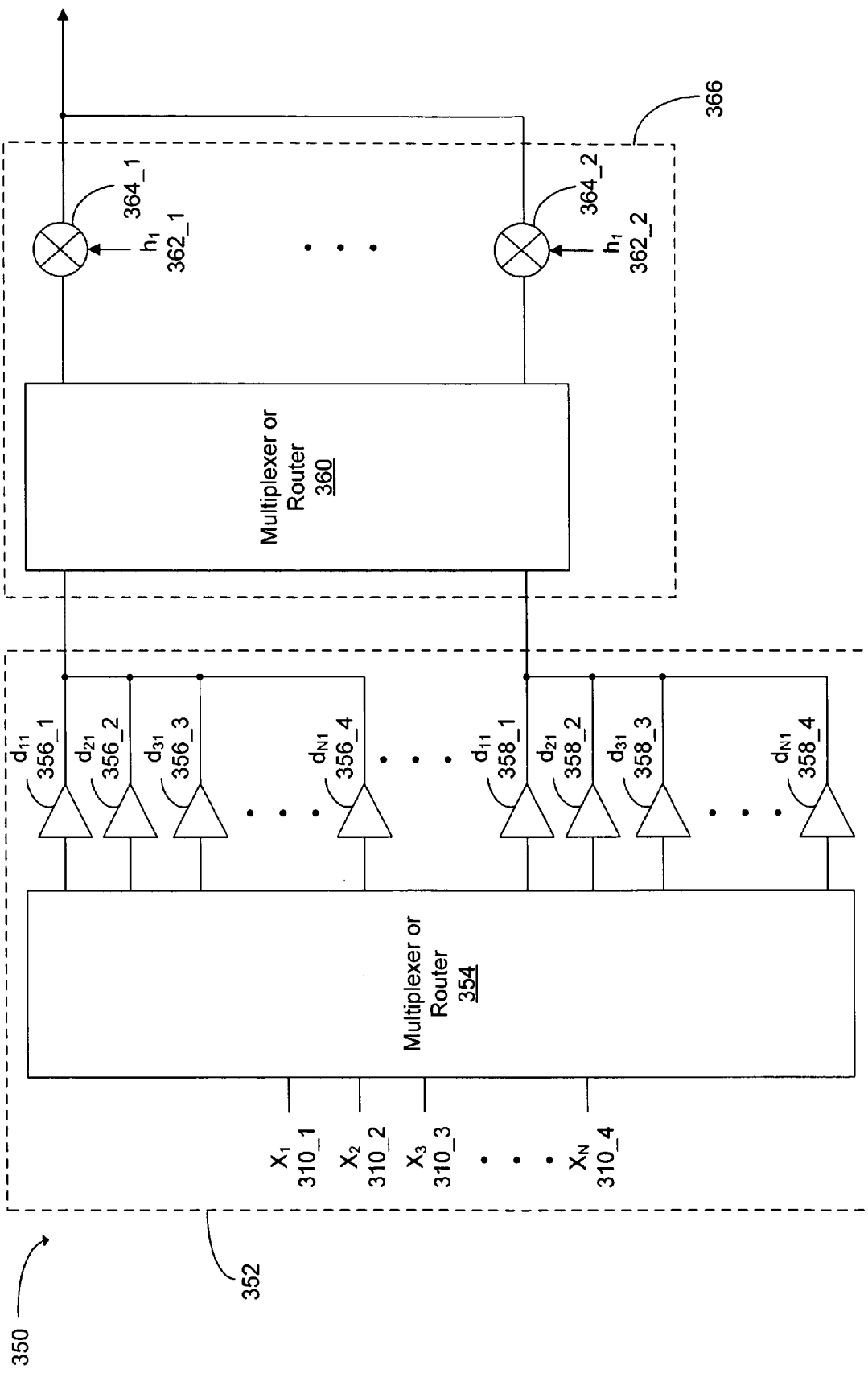
FIG. 3B is a block diagram illustrating an embodiment of a transform circuit.

FIG. 3B illustrates an embodiment of a transform circuit 350 including a first stage circuit 352 and a second stage circuit 366. The first stage circuit 352 maps the set of N digital data symbols from the N parallel data streams 310 to the N analog data symbols by generating the N sets of weighted sums of the N digital data symbols. The N sets of weighted sums are generated using a plurality of parallel sub-circuits. Each sub-circuit includes a plurality of fixed gain drivers (also sometimes called fixed weight drivers), such as fixed gain drivers 356 and fixed gain drivers 358. The gains in one set of fixed gain drivers 356 in one sub-circuit may be the same or may be different from the gains of the fixed gain drivers 358 in another sub-circuit. A pre-determined set of gain values (also sometimes called weighting values) during the first-stage time interval, corresponding to the period of the clock Clk/N 218 (FIG. 2A), may be applied by coupling at least a subset of the N parallel data streams to a respective set of fixed gain drivers using multiplexer or router 354. The control signals from the FSM 226 (FIG. 2A) and/or the control logic 228 (FIG. 2A) may control the multiplexer or router 354. In this way, at least a subset of the N digital data symbols may be multiplied by a corresponding subset of the pre-determined weighting values in the first matrix.

The second stage circuit 366 maps the N analog data symbols to the sequence of N output signals over the N second-stage time intervals. Each of the N output signals corresponds to the respective weighted sum of the N analog data symbols. The second stage circuit 366 includes a plurality of multipliers 364 having fixed weights or gains 362. Respective pre-determined weighting values or gains 316 during each second-stage time interval, corresponding to the period of the clock Clk 222 (FIG. 2A), may be applied by coupling at least a subset of the N analog data symbols to a respective set of fixed gain multipliers using multiplexer or router 360. The control signals from the FSM 226 (FIG. 2A) and/or the control logic 228 (FIG. 2A) may control the multiplexer or router 360. In this way, at least a subset of the N analog data symbols is multiplied by a corresponding subset of the pre-determined weighting values in the second matrix. In some embodiments, a multiplexer may be included at the output of the multipliers 364.

In an alternate embodiment of the transform circuit 350, the multiplexer or router 354 may couple the N parallel data streams 310 during N second stage time intervals to one or more sets of fixed weight drivers, such as fixed gain drivers 356. The sets of fixed weight drivers may be a permutation on a common group of weights. A total number of the fixed weight drivers may be reduced relative to other embodiments, i.e., one or more of the fixed weight drivers may be shared. A sample and hold, i.e., storage, may be included between the fixed gain drivers 356 and the multiplexer or router 360. In an alternate embodiment, the transform circuit 350 may be implemented using digital circuitry, with a DAC at the output of circuit 350.

While the transform circuit 300 (FIG. 3A) implements programmable drivers and multipliers and the transform circuit 350 implements fixed gain drivers and multipliers, in some embodiments a first stage circuit may implement programmable drivers and a second stage circuit may implement fixed gain multipliers. In other embodiments, a first stage circuit may implement fixed gain drivers and a second stage circuit may implement programmable multipliers.

Referring back to FIG. 2A, in some embodiments of the transform circuit 200 the digital data symbols in the data stream 210 are complex, having an in-phase (I) component and an out-of-phase (Q) component. The Q component may be 90° out of phase with respect to the I component. The digital data symbols may also be multi-level symbols based on a bit-to-symbol modulation code. Suitable symbol coding may include two or more level pulse amplitude modulation (PAM), such as two-level pulse amplitude modulation (2PAM), four-level pulse amplitude modulation (4PAM), eight-level pulse amplitude modulation (8PAM) or sixteen-level pulse amplitude modulation (16PAM). In embodiments where at least one of the data streams 210 corresponds to a passband sub-channel, i.e., a band of frequencies not including DC, on-off keying (OOK), may be used. Suitable coding corresponding to one or more passband sub-channels may also include quadrature amplitude modulation (QAM).

In embodiments where the digital data symbols in the data streams 210 are complex, the first stage circuit 216 and the second stage circuit 220 may implement complex weighting or multiplication. This is illustrated further in FIGS. 4 and 5.

Figure 4:
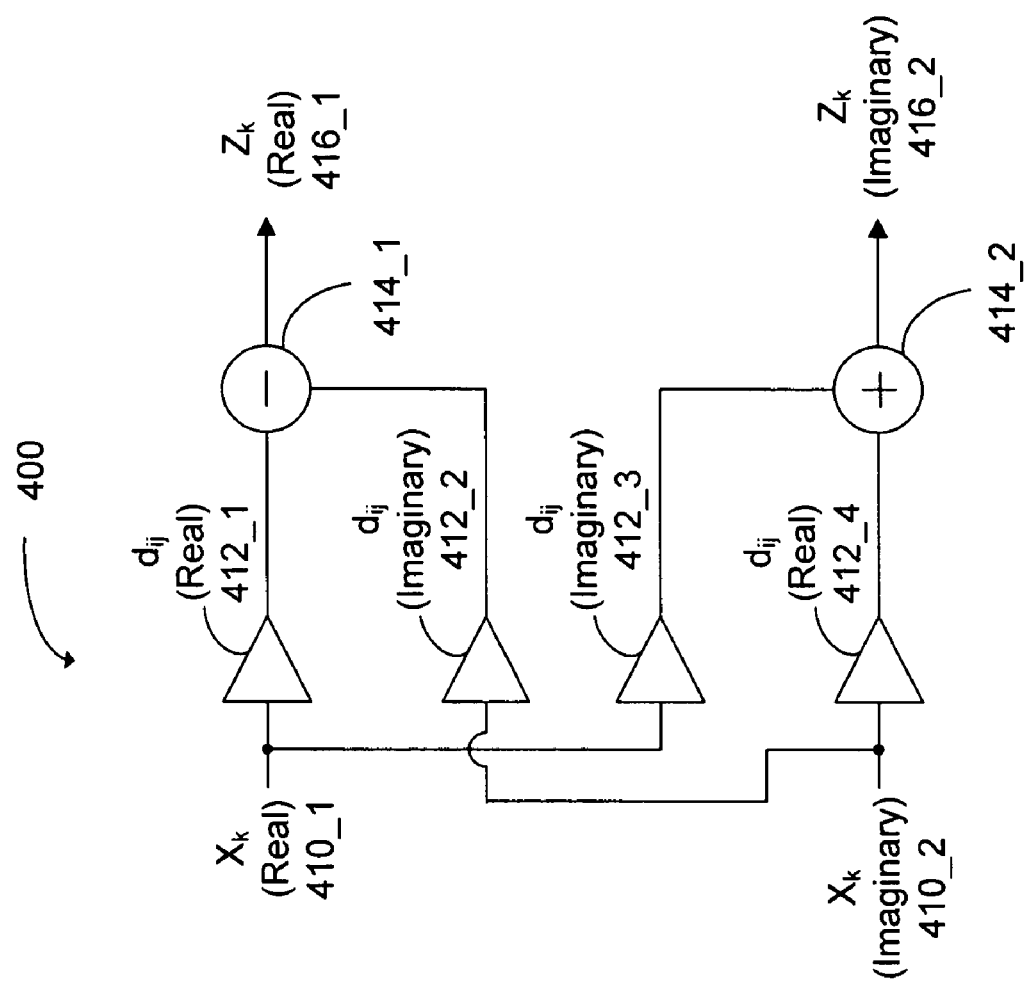
FIG. 4 is a block diagram illustrating an embodiment of a driver implementing complex multiplication.

FIG. 4 illustrates an embodiment of complex multiplication 400 in drivers 412 in the first stage circuit 216 (FIG. 2A). The drivers 412 may be programmable, as in the transform circuit 300 (FIG. 3A), or fixed gain, as in the transform circuit 350 (FIG. 3B). In the complex multiplication 400, a complex digital data symbol 410 is multiplied in the drivers 412. The complex multiplication 400 includes cross-terms, such as provided by drivers 412_2, 412_3. Outputs from the drivers 412 are summed in summing circuits 414 generating complex analog data symbol 416, which is a weighted sum of in-phase component 410_1 and out-of-phase component 410_2.

Figure 5:
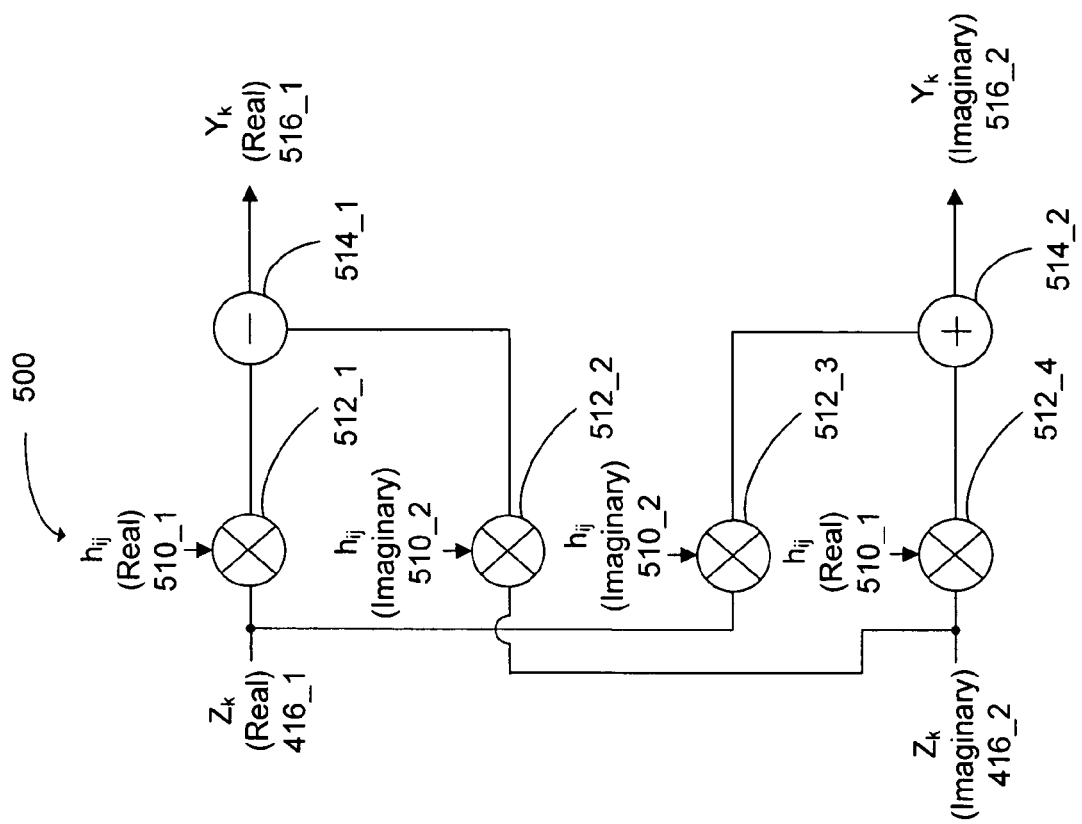
FIG. 5 is a block diagram illustrating an embodiment of a multiplier implementing complex multiplication.

FIG. 5 illustrates an embodiment of complex multiplication 500 in multipliers 512 in the second stage circuit 220 (FIG. 2A). The multipliers 512 may be programmable, as in the transform circuit 300 (FIG. 3A), or fixed gain, as in the transform circuit 350 (FIG. 3B). In the complex multiplication 500, the complex analog data symbol 416 is multiplied by weights 510 in the multipliers 512. The complex multiplication 500 includes cross-terms, such as provided by multiplier 512_2. Outputs from the multipliers 512 are summed in summing circuits 514 generating complex output signal 516, which includes in-phase component 410_1 and out-of-phase component 410_2. If an analog data symbol 416_1 corresponds to a baseband sub-channel, the multipliers 512 may be excluded. If the complex analog data symbol 416 corresponds to a respective passband sub-channel, complex output signal 516_1 may be multiplied by $\cos(\omega t)$, where $\omega$ is an angular frequency corresponding to the passband sub-channel, complex output signal 516_2 may be multiplied by $\sin(\omega t)$, and resulting outputs may be summed.

Figure 7:
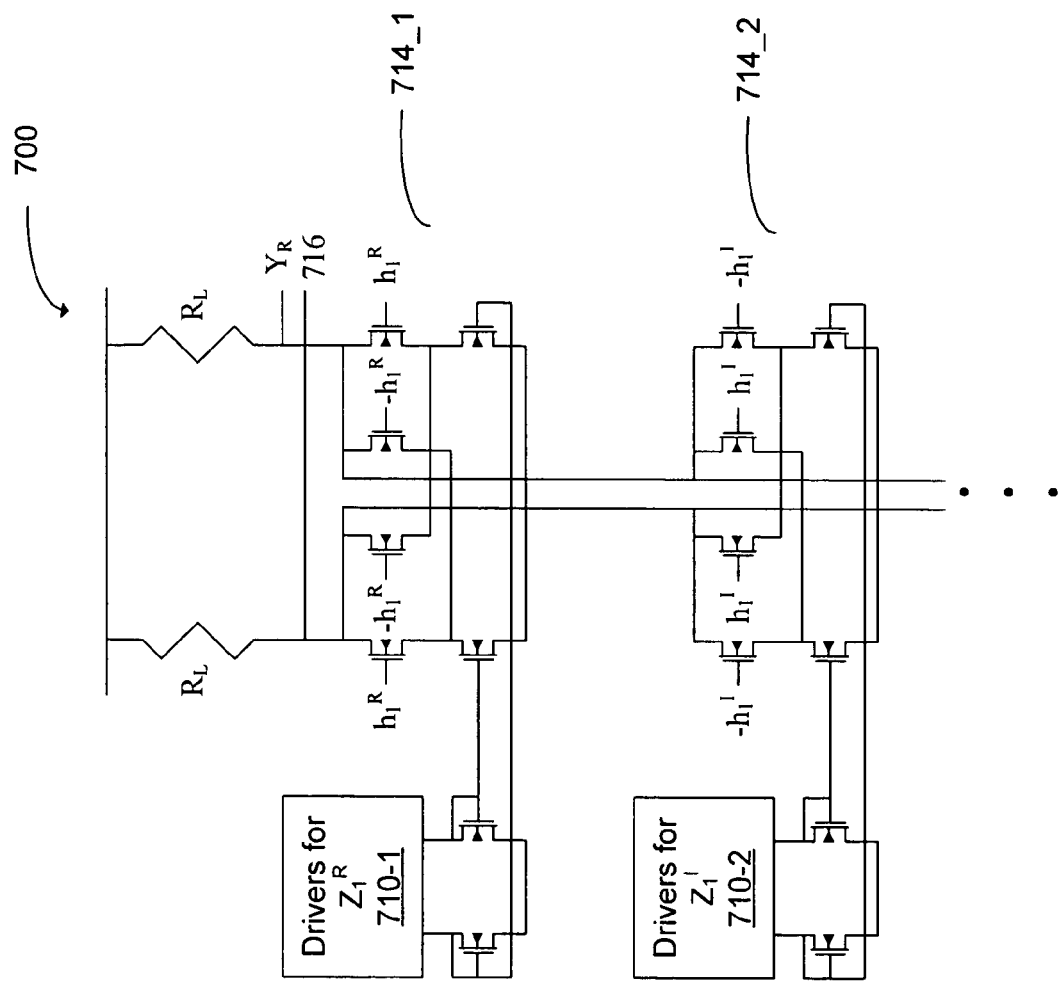
FIG. 7 is a block diagram illustrating an embodiment of a transform circuit.

FIG. 7 illustrates an embodiment of a transform circuit 700. Drivers 710 for the first stage circuit 216 (FIG. 2A) are implemented using current mirrors operating at a rate of CR/N, where CR is the clock rate of a main or master clock signal of the transform circuit 700. Multiplication in the second stage circuit 220 (FIG. 2A) may be implemented using groups of switches 714 routing currents mirrored from the first stage. The groups of switches 714 operate at a rate of CR. Instances of the circuit 700 may be repeated for other digital data symbols generating additional complex analog data symbols. The power for a respective complex analog data symbol may be adjusted using the drivers 710.

In alternate embodiment, the transform circuit 700 may include constellation mapping (not shown) in N digital-to-analog converters (DACs) prior to the drivers 710. Instead of using one or more data streams as an input to the drivers 710, analog signals may be used as inputs. For example, 3-bit DACs may output 8-level PAM or 64-level QAM analog signals to the drivers 710.

Figure 8:
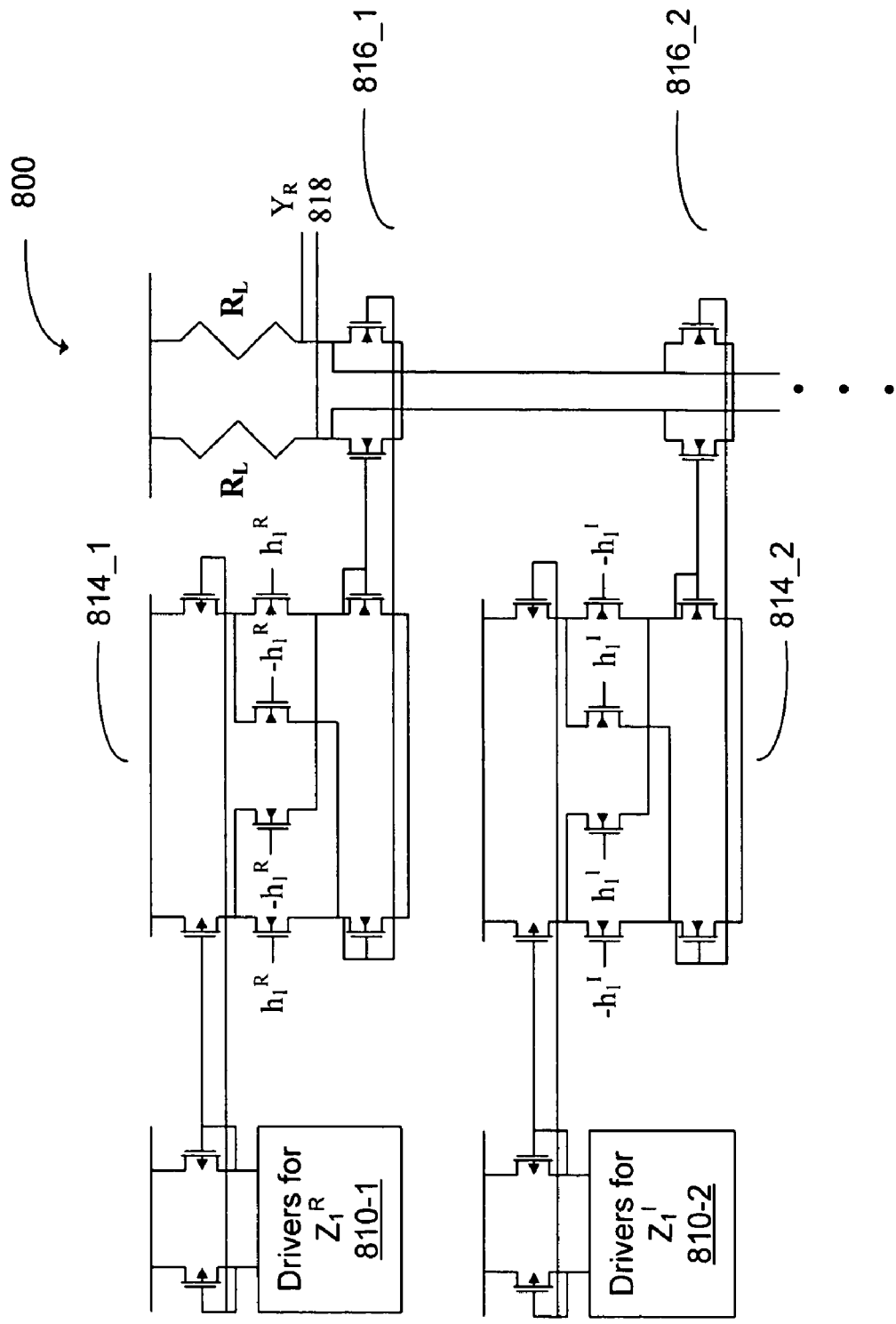
FIG. 8 is a block diagram illustrating an embodiment of a transform circuit.

FIG. 8 illustrates an alternate embodiment of a transform circuit 800. If more current is needed in drivers 810 due to transistor minimum sizes and quantization requirements, current in groups of switches 814 may be decreased and additional current mirrors 816 operating at the rate of a main or master clock signal of the transform circuit 800 may be added to generate complex analog data symbol 818.

Referring back to FIG. 2A, the transform circuit 200 may be used to implement a wide variety of transformations, including linear transformations that are a weighted sum of the digital data symbols in the data stream 210. The transform circuit 200 may also implement generalized orthogonal coding or frequency-to-time transformations, such as a Hadamard transformation, a discrete cosine transformation (DCT), a discrete Fourier transform (DFT) or an inverse discrete Fourier transform (IDFT).

The linear transformation may be varied for different first-stage time intervals and/or during a sequence of first-stage time intervals. The linear transformation may be adapted. The adaptation may be dynamic. For example, a respective linear transformation may be selected in accordance with at least a characteristic, such as a notch in a band of frequencies, of the communications channel in the communications system that includes the transform circuit 200. The respective linear transformation may be selected in accordance with at least one receiver device coupled to the communications system that includes the transform circuit 200.

An exemplary embodiment of the linear transformation in the transform circuit 200 is the IDFT. The IDFT may be expressed as a matrix F having elements $$F_{mn} = e^{j\left(\frac{2\pi}{N}\right)mn}.$$

The IDFT of a set of digital data symbols X is IDFT(X). In matrix form IDFT(X) is $$\begin{bmatrix} IDFT(X)_1 \\ IDFT(X)_2 \\ IDFT(X)_m \\ IDFT(X)_N \end{bmatrix} = \begin{bmatrix} 1 & 1 & 1 & 1 \\ 1 & e^{\frac{j(2\pi)}{N}2} & \ldots & e^{\frac{j(2\pi)}{N}2(N-1)} \\ 1 & e^{\frac{j(2\pi)}{N}2m} & \ldots & e^{\frac{j(2\pi)}{N}m(N-1)} \\ 1 & e^{\frac{j(2\pi)}{N}2(N-1)} & \ldots & e^{\frac{j(2\pi)}{N}(N-1)(n-1)} \end{bmatrix} \cdot \begin{bmatrix} X_1 \\ X_2 \\ X_m \\ X_N \end{bmatrix},$$

where an entry in the IDFT(X) vector is given by $$IDFT(X)_m = F_m X = \sum_{l}^{N} F_{mn} X_n.$$

If digital data symbols are processed serially, the IDFT is a correlator with time-varying correlation coefficients (the rows of F).

Recognizing that certain operations, such as a change of sign, are easier to implement in high-speed analog circuits than others, the IDFT may be decomposed into two matrices. The first matrix is a weighting phase and the second matrix corresponds to an operation that may be implemented in high-speed analog circuits. The first-stage circuit 216, which implements the first matrix, operates at a rate of CR/N, where CR is a main clock rate corresponding to a data rate of the data stream being processed by the transform circuit. The second-stage circuit 220, which implements the second matrix, operates at the main clock rate, CR.

The IDFT matrix F may be decomposed into $$F = HD^H,$$

where H and $D^H$ are matrices and the superscript 'H' represents a Hermitian transformation.

Thus $$IDFT(X) = FX = (HD^H)X = H(D^H X)$$

and $$IDFT(X) = (d_1^H X)h_1 + (d_2^H X)h_2 + \ldots + (d_N^H X)h_N.$$

Embodiments implementing this last equation are shown in FIGS. 3A and 3B, where $D^H$ corresponds to the first matrix and H corresponds to the second matrix. In embodiments where values in the second matrix H do not correspond to sines and cosines, i.e., are not IDFT matrix coefficients, the first matrix $D^H$ may provide compensation such that the product $HD^H$ equals the IDFT. In exemplary embodiments, therefore, a DFT of $HD^H$ should substantially result in the identity matrix.

In exemplary embodiments, entries in H include ±1 and/or ±j, where j indicates a value 90° out-of-phase with 1. In these embodiments, angles corresponding to the entries in F are quantized in the complex plane to 0° and 180° and/or 90° and 270°. Restricting entries in H to ±1 corresponds to real multiplication of the digital data symbols, while including ±1 and ±j corresponds to multiplying the I component and the Q component of the digital data symbols (complex multiplication) as illustrated in FIG. 5.

H may be decomposed into a matrix with real entries and a matrix with imaginary entries. However, multiplying by an entry of 0, i.e., nulling, may not be desired. Therefore, in some embodiments, H may be multiplied by 1+j and $D^H$ may be divided by 1+j. The resulting modified H matrix has entries of ±1±j. The modified H matrix can be decomposed into a matrix with real entries and a matrix with imaginary entries that will not result in multiplication by an entry of 0. In an alternate embodiment, H may only include real entries. In this embodiment, however, $D^H$ will be more complicated.

Consider some examples. For N=4 and H including entries of ±1 and ±j we have $$H_4 = \begin{bmatrix} 1 & 1 & 1 & 1 \\ 1 & j & -1 & -j \\ 1 & -1 & 1 & -1 \\ 1 & -j & -1 & j \end{bmatrix}$$

and $D^H$ is the identity matrix. In some embodiments, a summation of each row in the first matrix $D^H$ equals a first value, such as 1, and a summation of each column in the first matrix $D^H$ equals the first value. For N=8 and H including entries of ±1 and ±j we have $$H_8 = \begin{bmatrix} 1 & 1 & 1 & 1 & 1 & 1 & 1 & 1 \\ 1 & 1 & j & j & -1 & -1 & -j & -j \\ 1 & j & -1 & -j & 1 & j & -1 & -j \\ 1 & j & -j & 1 & -1 & -j & j & -1 \\ 1 & -1 & 1 & -1 & 1 & -1 & 1 & -1 \\ 1 & -1 & j & -j & -1 & 1 & -j & j \\ 1 & -j & -1 & j & 1 & -j & -1 & j \\ 1 & -j & -j & -1 & -1 & j & j & 1 \end{bmatrix} \text{ and}$$

$$D_8^H = \begin{bmatrix} 1 & 0 & 0 & 0 & 0 & 0 & 0 & 0 \\ 0 & 0.8536+0.3536i & 0 & 0 & 0 & 0.1464-0.3536i & 0 & 0 \\ 0 & 0 & 1 & 0 & 0 & 0 & 0 & 0 \\ 0 & 0 & 0 & 0.8536+0.3536i & 0 & 0 & 0 & 0.1464-0.3536i \\ 0 & 0 & 0 & 0 & 1 & 0 & 0 & 0 \\ 0 & 0.1464-0.3536i & 0 & 0 & 0 & 0.8536+0.3536i & 0 & 0 \\ 0 & 0 & 0 & 0 & 0 & 0 & 1 & 0 \\ 0 & 0 & 0 & 0.1464-0.3536i & 0 & 0 & 0 & 0.8536+0.3536i \end{bmatrix}.$$

Note that in each of the examples provided above, a sign of entries in the matrices can be reversed, producing another solution to the decomposition into the first matrix and the second matrix. This is also true for the decomposition into the third matrix and the fourth matrix.

Instead of implementing F, in some embodiments $S_{T_X}$ F may be implemented. $S_{T_X}$ is a diagonal matrix with diagonal entries $[\exp(-j\theta_1), \exp(-j\theta_2), \ldots \exp(-j\theta_N)]$. The parameters $\theta_i$ may be selected to simplify D by minimizing $$\Sigma(|Re(D^H)|_1 + |Im(D^H)|_1).$$

This may be possible in embodiments where phase distortion in a channel between a transmitter and a receiver is compensated (reduced or eliminated) using an additional one-tap equalizer and/or through $S_{T_X}$. In exemplary embodiments, H may include values such as $\pm 1$ and/or $\pm j$, i.e., quantized values in the complex plane of 0 and 180° and/or 90° and 270°.

While embodiments with H and $D^H$ matrices based on such an optimization procedure have been described, note that there are a wide variety of solutions to the decomposition problem including many that are not optimal. For example, so long as H is of full rank, i.e., has an inverse, a solution for $D^H$ exists. Thus, if a random change is made to one or more entries in H, a corresponding $D^H$ matrix can be determined. In general, there are a myriad of potential changes that may be made to the H matrix. Of these, there is a group that does not impact the entries in the $D^H$ matrix appreciably. It is understood, therefore, that the examples provided above are illustrative of a broad class of decomposition solutions, and that each may be optimal for certain design criteria such as power minimization, speed maximization, etc.

Figure 6:
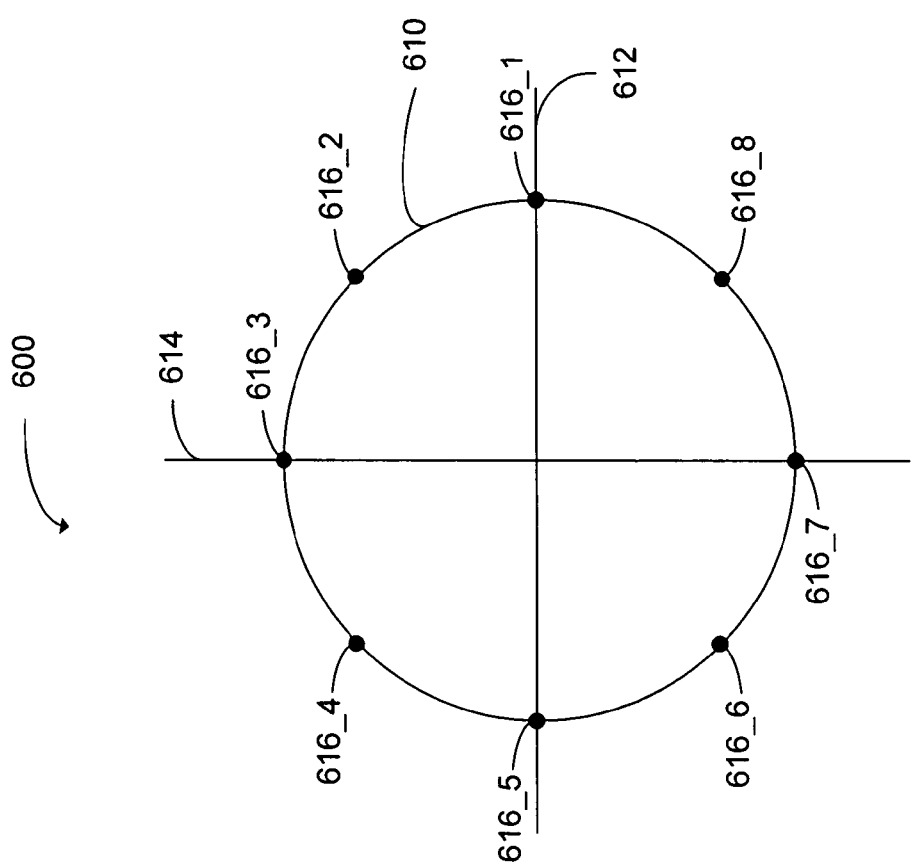
FIG. 6 is a schematic diagram illustrating samples in a complex plane.

Angular quantization may be implemented by modifying a phase of at least a subset of the digital data symbols in one or more data streams. FIG. 6 illustrates a complex plane 600 including a real axis 612 and an imaginary axis 614. Samples 616, which correspond to entries in the F matrix, are arranged on a unit circle 610, i.e., a magnitude of each of the samples 616 is one. In order to create the H matrix, the angle of samples 616 may be rounded to 0°, 90°, 180° and/or 270°. Alternatively, samples 616 around the unit circle 610 may be rotated clockwise or counter clockwise. For example, sample 616_2 is mapped to sample 616_1 or sample 616_4 is mapped to sample 616_3 or j, and so forth. Quantization embodiments include those with all real samples (at 0° and 180° or 90° and 270°) as well as those with complex samples (at 0°, 90°, 180°, and 270°).

In some embodiments, different angular quantizations may be applied to different quadrants of the IDFT matrix F. Expressing F in terms of four quadrants $$F = \begin{bmatrix} Q_1 & Q_2 \\ Q_3 & Q_4 \end{bmatrix}$$

an exemplary embodiment has a first angular quantization applied to $Q_1$ and $Q_4$ and a second angular quantization applied to $Q_2$ and $Q_3$. Alternatively, a common angular quantization may be applied to the entire IDFT matrix F. Quantization embodiments may include rounding samples 616 (FIG. 6) down or up.

In some embodiments, one or more instance of the transform circuit 200, the angular quantization in the first matrix and/or the second matrix, and or the number of bits $N_b$ corresponding to at least a subset of the digital data symbols in one or more data streams may be configured and/or adjusted.

Figure 2B:
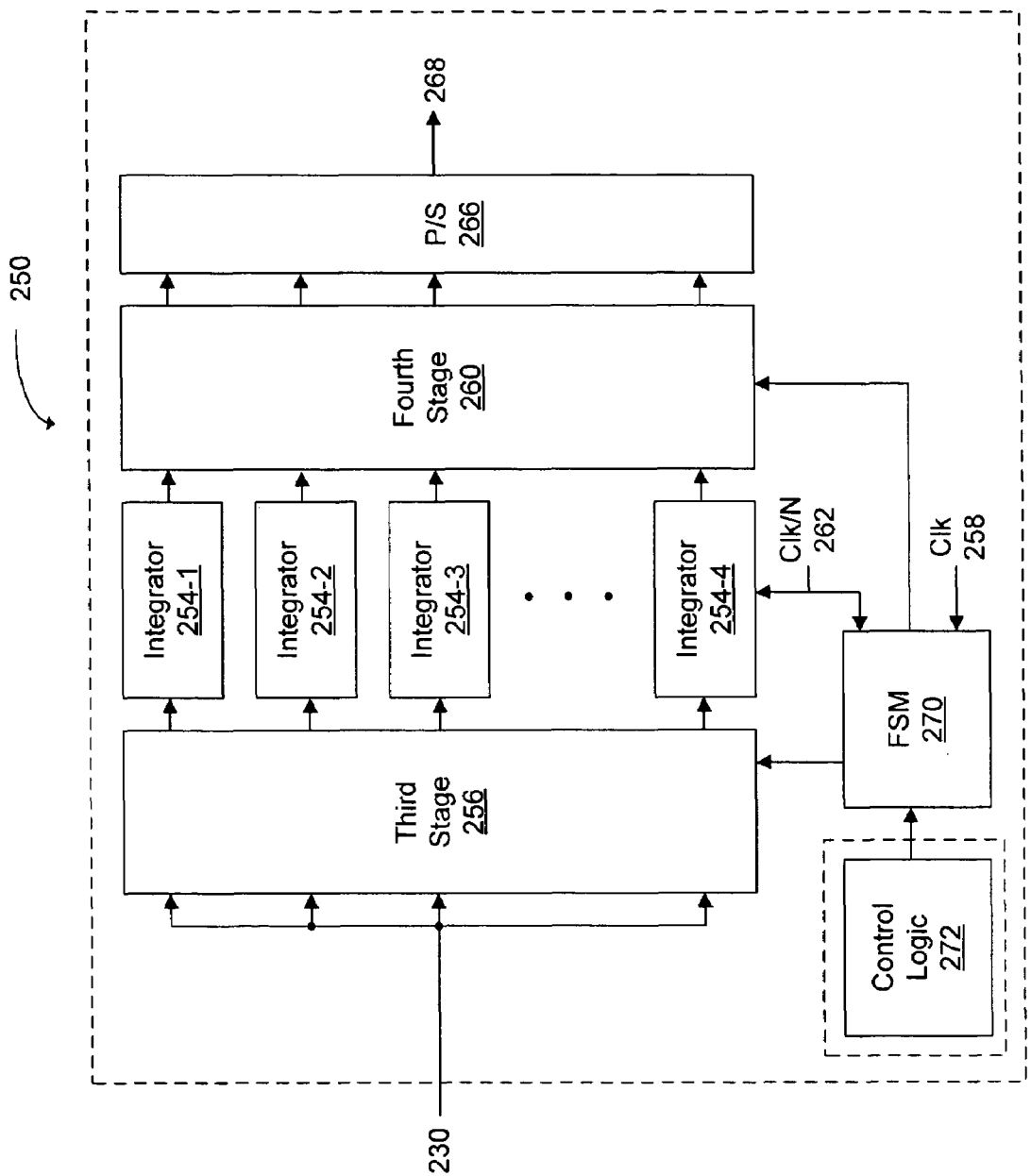
FIG. 2B is a block diagram illustrating an embodiment of a transform circuit.

FIG. 2B illustrates an embodiment of a transform circuit 250. The transform circuit 250 may be used in a receiver in a communications system. The transform circuit 250 includes a third stage circuit 256 and a fourth stage circuit 260. The third stage circuit 256 and the fourth stage circuit 260 implement third and fourth mappings that correspond to third and fourth matrix decompositions of a pre-defined transformation. The third and fourth mappings together generate the pre-defined transformation of N analog signals into N digital data symbols. In an exemplary embodiments, N is 2, 4, 8, 16, 32, 64, 128, 256, 512 or 1024. In some embodiments, N is greater than 3.

In the transform circuit 250, the analog signal 230 is coupled N times to the third stage circuit 256. The third stage circuit 256 maps the N analog signals to N sequences of N analog data symbols over N third-stage time intervals. Each of the N sequences of N analog data symbols corresponds to a respective weighted sum of a respective set of analog signals. Each respective weighted sum is defined by a respective set of pre-determined weighting values in the third matrix.

The N sequences of N analog data symbols are coupled to integrators 254. The integrators 254 integrate each of the N sequences of N analog data symbols for N fourth-time time intervals producing N integrated sequences.

The N integrated sequences are coupled to the fourth stage circuit 260. The fourth stage circuit 260 maps the N integrated sequences to the N digital data symbols by generating a set of weighted sums of the N integrated sequences. Each respective weighted sum is defined by a respective set of pre-determined weighting values in the fourth matrix.

The N digital data symbols are optionally coupled to parallel-to-serial (P/S) converter 266. The P/S converter 266 outputs a data stream 268. The P/S converter 266 may be omitted in embodiments in which the receiving circuit or system is configured to receive parallel streams of data.

In some embodiments, the transform circuit 250 includes optional de-framer circuits (not shown). The de-framer circuits may remove cyclic padding from the N digital data symbols. In alternate embodiments, deframing may be accomplished by controlling a start time and an end time of the integrators to discard initial or final samples.

In some embodiments, the fourth stage circuit 260 may be implemented using digital circuits or using a mixture of digital and analog circuits. The fourth stage circuit 260 may, therefore, include analog-to-digital converters (ADCs) immediately after the integrators 254 or at an internal stage within the fourth stage circuit 260.

The third stage circuit 256 operates at a clock rate governed by clock Clk 258. The fourth stage circuit 260 operates at a clock rate governed by clock Clk/N 262, i.e., at a rate N-times lower than the clock rate of clock Clk 258. Therefore, each third-stage time interval in the N third-stage time intervals may correspond to the period of the clock Clk 258. The clock Clk 258 at least fulfills the Nyquist criterion, i.e., a sampling rate in portions of the transform circuit 250 that are in the digital domain is at least two times aggregate symbol rate of the received analog signal 230. In an exemplary embodiment, the clock Clk 258 is 10 GHz and the clock Clk/N 262 is 2.5 GHz, i.e., N equals 4. In this example, the data stream 268 includes transformations of the analog signal 230 at a rate of 2.5 GHz.

The transform circuit 250 may include a finite state machine (FSM) 270 and/or control logic 272. The control logic 272 may be implemented in the transform circuit 250. Alternatively, the control logic 272 may be implemented outside of the transform circuit 250. The FSM 270 and/or the control logic 272 may provide control signals to the third stage circuit 256 and/or the fourth stage circuit 260. The control signals may configure, adjust and/or program the third mapping and/or the fourth mapping. In some embodiments, the control signals may be fixed over two or more third-stage time intervals.

In some embodiments, the transform circuit 250 may have fewer or more components. Functions of two or more components may be implemented in a single component. Alternatively, functions of some components may be implemented in additional instances of the components. For example, in some embodiments there may be more than one FSM 270, more than one control logic 272, and/or one or more external interface. There may also be more than one instance of the transform circuit 250. Each instance of the transform circuit may be applied to a respective analog signal, such as the analog signal 230. In embodiments where the transform circuit 250 is included in a receiver, the FSM 270 and/or the control logic 272 may receive instructions from a controller coupled to the other end of a communications channel, i.e., on the transmitter side. In some embodiments, the clock Clk/N 262 may be input the third stage circuit 256 either in addition to or instead of the FSM 270 and/or the integrator 254. Similarly, the clock Clk 258 may be input the fourth stage circuit 260 either in addition to or instead of the FSM 270.

Figure 9A:
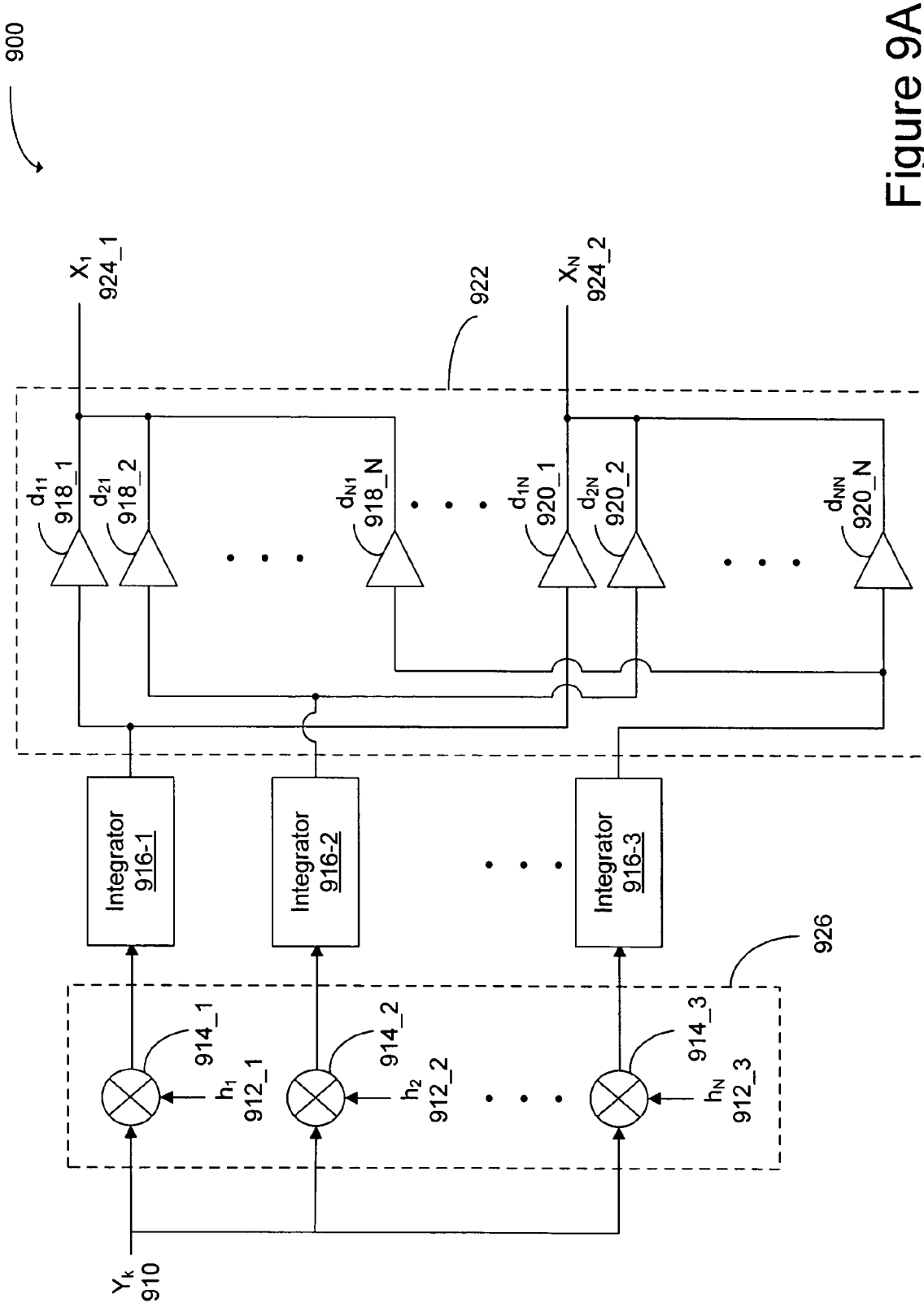
FIG. 9A is a block diagram illustrating an embodiment of a transform circuit.

FIG. 9A illustrates an embodiment of a transform circuit 900 including a third stage circuit 926 and a fourth stage circuit 922. The third stage circuit 926 maps an analog signal 910 to N sequences of N analog data symbols over N third-stage time intervals. N weighted sums (of the sequences of analog data symbols) are generated using N programmable multipliers 914 and integrators 916. The FSM 270 (FIG. 2B) and/or the control logic 272 (FIG. 2B) provide respective pre-determined weighting values or gains 912 for modulating or multiplying the analog signal 910 during each third-stage time interval. For instance, each third stage interval may be a period of the clock Clk 258 (FIG. 2B). Multiplication in each of the multipliers 914 by successive respective subsets of the pre-determined weighting values during N successive third-stage time intervals produces N analog data symbols.

The N sequences of N analog data symbols (produced by third stage circuit 926) are coupled to integrators 916. The integrators 916 integrate each of the N sequences of N analog data symbols for N third-time time intervals, producing N integrated sequences.

The fourth stage circuit 922 maps the N integrated sequences to N digital data symbols in data stream 924 by generating a set of weighted sums of the N integrated sequences using up to $N^2$ programmable gain drivers 918 and 920. A pre-determined set of weighting or gain values during a fourth-stage time interval, corresponding to period of the clock Clk/N 262 (FIG. 2A), may be provided to the programmable gain drivers 918 and 920 by the FSM 270 (FIG. 2B) and/or the control logic 272 (FIG. 2B). Note the cross coupling of the N integrated sequences to the programmable gain drivers 918 and 920.

Figure 9B:
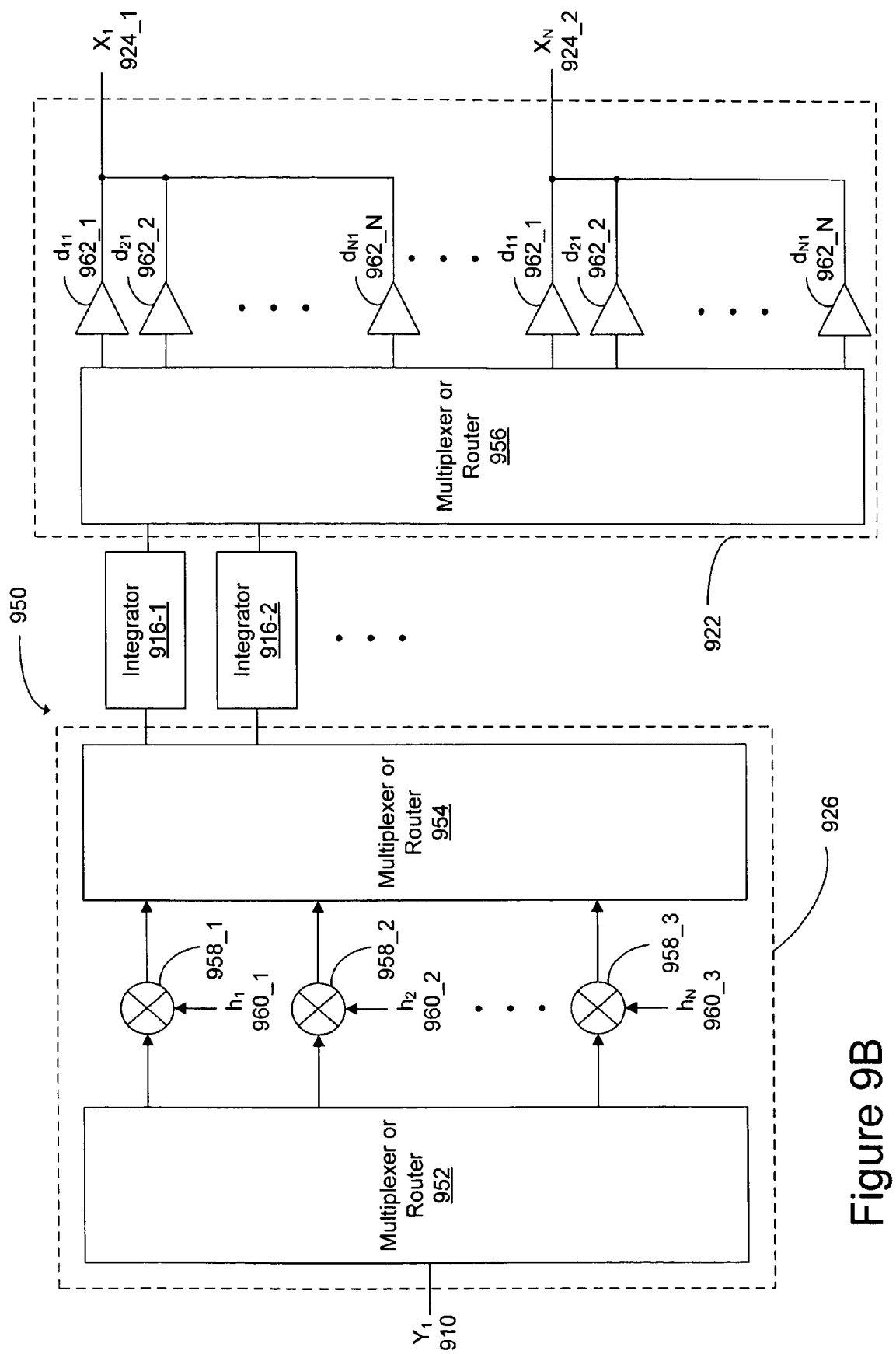
FIG. 9B is a block diagram illustrating an embodiment of a transform circuit.

FIG. 9B illustrates an embodiment of a transform circuit 950 including a third stage circuit 926 and a fourth stage circuit 922. The third stage circuit 926 maps a respective analog signal 910 to a sequence of N analog data symbols over N third-stage time intervals. Additional instances of the third stage circuit 926 map the remaining N−1 analog signals to the remaining sequences of N−1 analog data symbols. The third stage circuit 926 includes a plurality of multipliers 958 having fixed weights or gains 960. Respective pre-determined weighting values or gains 960 during each third-stage time interval, corresponding to a period of the clock Clk 258 (FIG. 2B), may be applied by coupling at least a subset of the respective analog signal 910 to a respective set of fixed gain multipliers using multiplexer or router 952. The control signals from the FSM 270 (FIG. 2B) and/or the control logic 272 (FIG. 2B) may control the multiplexer or router 952. In this way, at least a subset of the respective analog signal 910_1 is multiplied by a corresponding subset of the pre-determined weighting values in the third matrix.

A multiplexer or router 954 may couple the sequence of N analog data symbols from the multipliers 958 to integrators 916 to produce the sequence of N analog data symbols. A respective integrated sequence from the integrators 916 is coupled to the fourth stage circuit 922, which maps the respective integrated sequence to a data stream 924_1 that includes digital data symbols by generating a set of weighted sums. While not shown in FIG. 9B, the fourth stage circuit 922 may also accept integrated sequences corresponding to other analog signals 910 (FIG. 9A). A pre-determined set of weighting or gain values are implemented in fixed gain drivers 962 may be applied during the fourth-stage time interval, corresponding to the period of the clock Clk/N 262 (FIG. 2B), by coupling at least a subset of the N integrated sequences to a respective set of fixed gain drivers using multiplexer or router 956. The control signals from the FSM 270 (FIG. 2B) and/or the control logic 272 (FIG. 2B) may control the multiplexer or router 956. In this way, at least a subset of the N integrated sequences may be multiplied by a corresponding subset of the pre-determined weighting values in the fourth matrix.

In an alternate embodiment of the transform circuit 950, the multiplexer or router 956 may couple the respective integrated sequence to one or more sets of fixed weight drivers, such as the fixed gain drivers 962. The sets of fixed weight drivers may be a permutation on a common group of weights. A total number of the fixed weight drivers may be reduced relative to other embodiments, i.e., one or more of the fixed weight drivers may be shared. A sample and hold, i.e., storage, may be included between the integrators 916 and the multiplexer or router 956.

While the transform circuit 900 (FIG. 9A) implements programmable drivers and multipliers and the transform circuit 950 implements fixed gain drivers and multipliers, in some embodiments a third stage circuit may implement programmable drivers and a fourth stage circuit may implement fixed gain multipliers. In other embodiments, a third stage circuit may implement fixed gain drivers and a fourth stage circuit may implement programmable multipliers.

In embodiments where the digital data symbols in the data stream 924 are complex, the third stage circuit 926 and the fourth stage circuit 922 may implement complex weighting or multiplication similar to that illustrated in FIGS. 4 and 5.

In some embodiments, the fourth stage circuit 922 may be fully digital, i.e., having digital inputs and digital outputs. Analog-to-digital converters (ADCs) may operate at a fraction of a signaling rate to convert one or more outputs from the integrators 916 to one or more digital signals that are input to the fourth stage circuit 922. In some embodiments, some or all of the third stage circuit 924 may be digital and/or some or all of the fourth stage circuit 922 may be digital. In some embodiments, the transform may be implemented using one or more additional stages or circuits. In some embodiments, the third stage circuit 924 and/or the fourth stage circuit 922 may be implemented in two or more stages.

Figure 10:
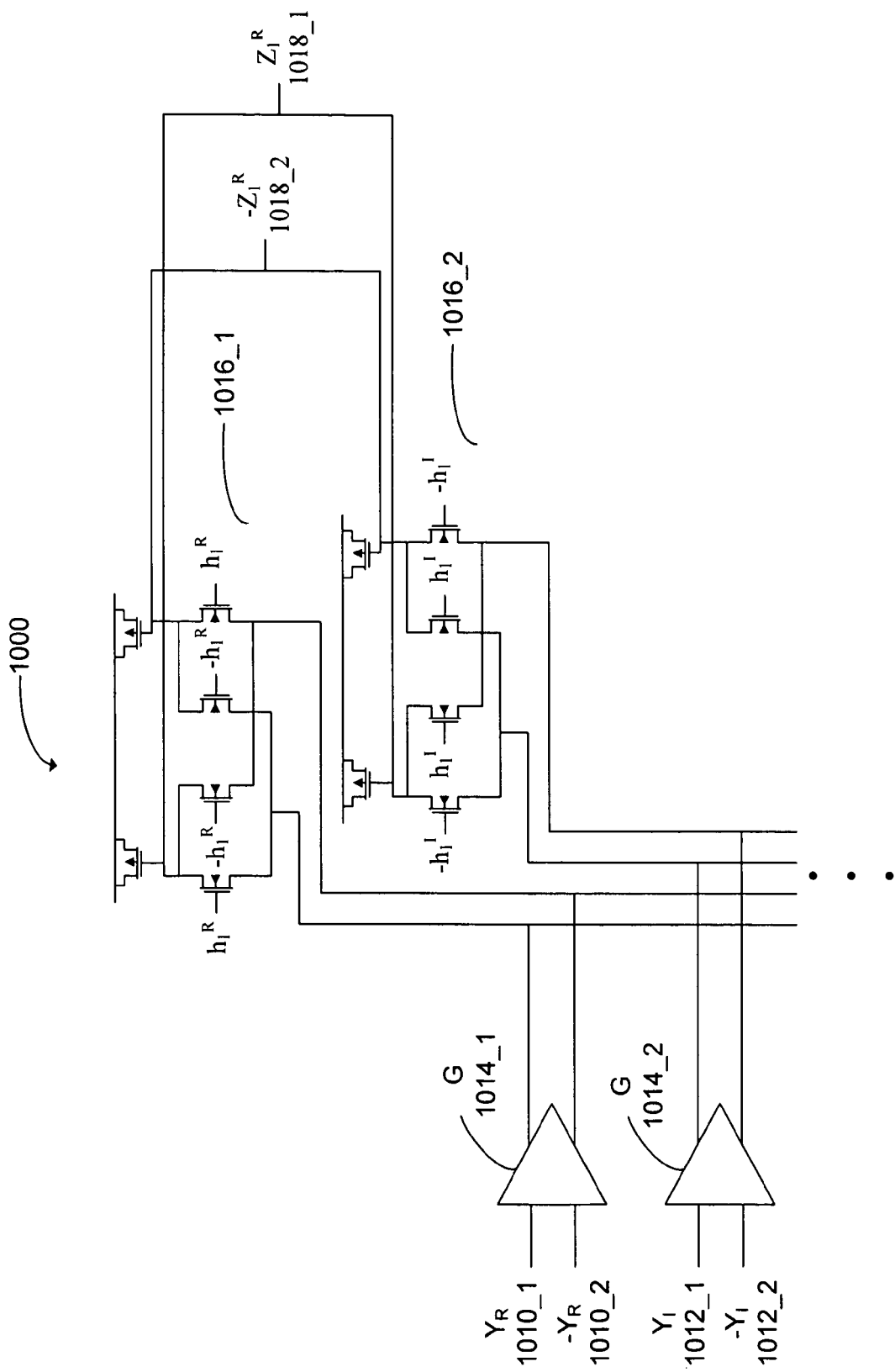
FIG. 10 is a block diagram illustrating an embodiment of a third stage circuit.

FIG. 10 illustrates an embodiment of a third stage circuit 1000. Differential amplifiers 1014 amplify analog signals 1010 and 1012. Groups of switches 1016 perform multiplication at a clock rate of CR. Load transistors act as capacitors and perform integration, generating integrated sequences 1018. Instances of the circuit 1000 may be repeated for other analog signals generating additional integrated sequences. The integrated sequences 1018 are sampled at CR/N and are used as inputs to a fourth stage (not shown). Reset switches for the integrating load transistors are also not shown.

Figure 11:
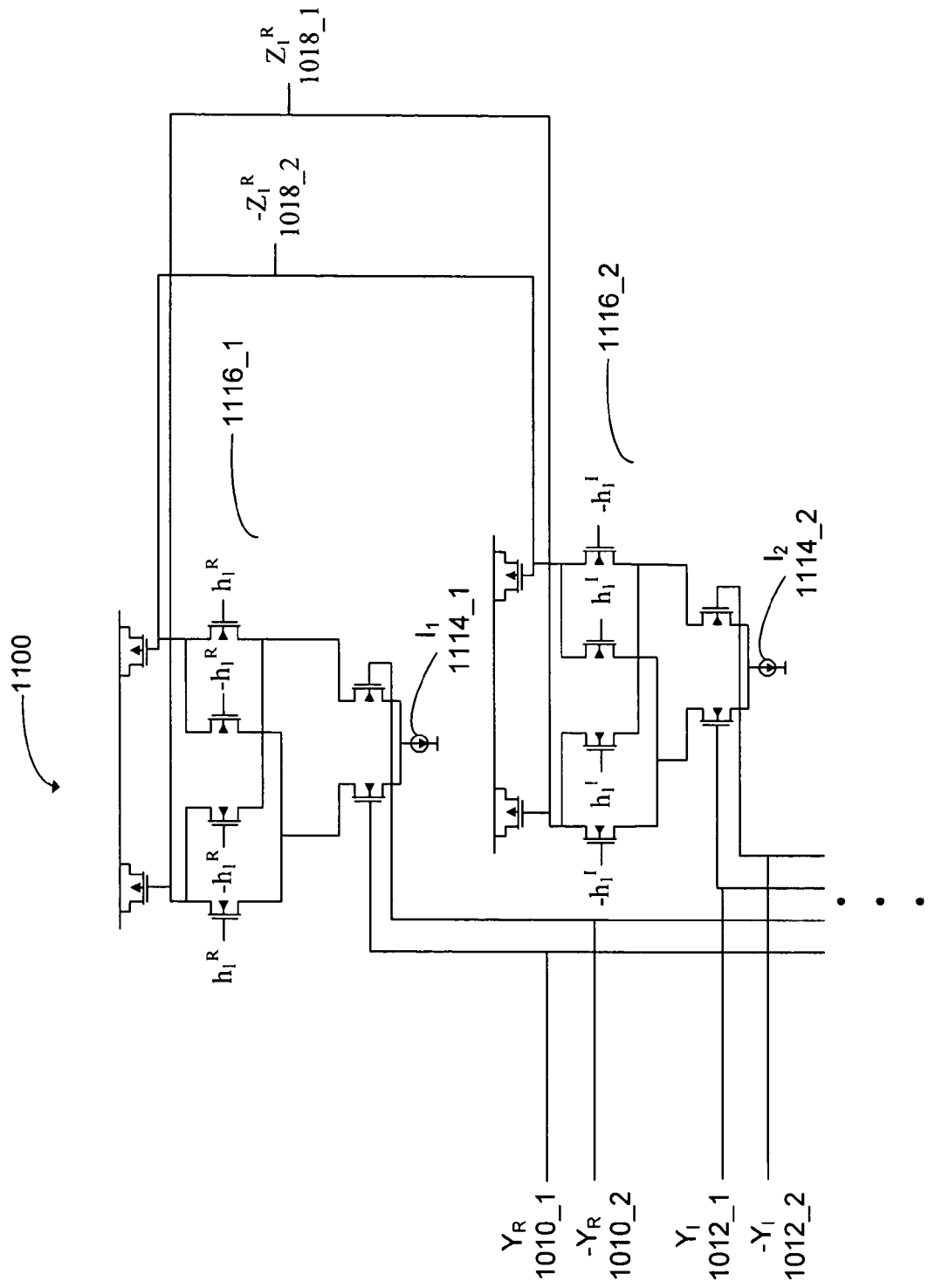
FIG. 11 is a block diagram illustrating an embodiment of a third stage circuit.

FIG. 11 illustrates an alternate embodiment of a third stage 1100 having dedicated differential amplifiers for individual branches. If more gain is needed in the differential drivers 1014 (FIG. 10), a differential amplifier with a current source 1114 may be coupled to the groups of switches 1116.

Referring back to FIG. 2B, the transform circuit 250 may be used to implement a wide variety of transformations, including linear transformations that are a weighted sum of the analog signal 230. The transform circuit 250 may also implement generalized orthogonal decoding or time-to-frequency transformations, such as an inverse Hadamard transformation an inverse discrete cosine transformation (IDCT), a discrete Fourier transform (DFT) or an inverse discrete Fourier transform (IDFT).

The linear transformation may be varied during each fourth-stage time interval and/or during a sequence of fourth-stage time intervals. The linear transformation may be adapted. The adaptation may be dynamic. For example, a respective linear transformation may be selected in accordance with at least a characteristic, such as a notch in a band of frequencies, of the communications channel in the communications system that includes the transform circuit 250. The respective linear transformation may be selected in accordance with at least one transmitter device coupled to the communications system that includes the transform circuit 250.

An exemplary embodiment of the linear transformation in the transform circuit 250 is the DFT. Taking advantage, once again, of the fact that certain operations, such as a change of sign, are easier to implement in high-speed analog circuits that others, the DFT may be decomposed into two matrices. The third matrix corresponds to an operation that may be implemented in high-speed analog circuits and the fourth matrix is a weighting phase. The third-stage circuit 256, which implements the third matrix, operates at the first clock rate, CR. The fourth-stage circuit 260, which implements the fourth matrix, operates at a clock rate of CR/N.

Thus, the DFT matrix $F^H$ may be decomposed into $$F^H = DH^H,$$

where D and $H^H$ are matrices. Thus $$DFT(Y) = F^H X = (DH^H)X = D(H^H X)$$

and $$IDFT(Y) = d_1(h_1^H Y) + d_2(h_2^H Y) + \ldots + d_N(h_N^H Y).$$

Embodiments implementing this last equation are shown in FIGS. 9A and 9B, where $H^H$ corresponds to the third matrix and D corresponds to the fourth matrix. In some embodiments, the fourth matrix D may provide compensation such that the product $DH^H$ equals the DFT. In exemplary embodiments, therefore, an IDFT of $DH^H$ should substantially result in the identity matrix.

Note that Hermitian transformation of the D and H matrices described previously for the IDFT may be used for the DFT since $$DFT = IDFT^H = DH^H = (HD^H)^H.$$

The procedure and criteria for determining the $H^H$ and D matrices is substantially similar to that described previously for the IDFT. In addition, in some embodiments the H matrix may be converted into the $H^H$ matrix, i.e., the third matrix, and the $D^H$ matrix may be converted into the D matrix, i.e., the fourth matrix.

As in the previous discussion of the transform circuit 200 (FIG. 2A), in embodiments including one or more instance of the transform circuit 250, the angular quantization in the third matrix and/or the fourth matrix, and or the number of bits $N_b$ corresponding to at least a subset of the digital data symbols in one or more data streams may be configured and/or adjusted.

In some embodiments, a transmitter may implement the IDFT and a receiver, coupled to the transmitter via a communications channel, may implement the DFT using the transform circuit 250. In these embodiments, the third-stage circuit 256 may correspond to the third matrix H having entries of ±1 and/or ±j.

In some embodiments, a receiver may implement the DFT and the transmitter may implement the IDFT using the transform circuit 200 (FIG. 2A). In these embodiments, the second-stage circuit 220 (FIG. 2A) may correspond to the second matrix H having entries of ±1 and/or ±j.

In some embodiments, the receiver may implement the DFT using the transform circuit 250 and the transmitter may implement the IDFT using the transform circuit 200 (FIG. 2A). In these embodiments, the second-stage circuit 220 (FIG. 2A) may correspond to the second matrix H having entries of ±1 and/or ±j and the third stage circuit 250 may correspond to the third matrix H having entries of ±1 and/or ±j.

In some embodiments, the transmitter may implement a linear transformation using the first matrix equal to $(D^*\Lambda D)^{-1}$ and the second matrix equal to H, where $\Lambda$ is a diagonal matrix and H has entries of ±1 and/or ±j. The receiver may implement a linear transformation equal to $H^H$, where H has entries of ±1 and/or ±j. In these embodiments, the fourth matrix is the identity matrix and the fourth stage circuit 260 may be omitted.

In some embodiments, the receiver including the transform circuit 250 may also include an equalizer. In an exemplary embodiment, the equalizer may have one complex tap for adjusting the magnitude and/or the phase. The equalizer may at least partially compensate for the transfer function of a communications channels coupled to the receiver. The equalizer may also provide additional degrees of freedom in a linear transformation implemented in the transmitter. For example, the linear transformation, implemented using the transform circuit 200 (FIG. 2A), may include an additional rotation of at least a subset of the digital data symbols. The additional rotation may allow power in one or more drivers to be reduced. The additional rotation may be removed using the equalizer in the receiver.

FIG. 12 illustrates an embodiment of a method or process for using a transform circuit. A set of N digital data symbols from N parallel data streams is mapped to N analog data symbols by generating N sets of weighted sums of the N digital data symbols (1210). Each respective weighted sum is defined by a respective set of pre-determined weighting values in a first matrix. The N analog data symbols are mapped to a sequence of N output signals over N time intervals (1212). Each of the N output signals corresponds to a respective weighted sum of the N analog data symbols. Each respective weighted sum is defined by a respective set of pre-determined weighting values in a second matrix. In some embodiments, there may be fewer or additional operations, an order of the operations may be rearranged and/or two or more operations may be combined.

Figure 13:
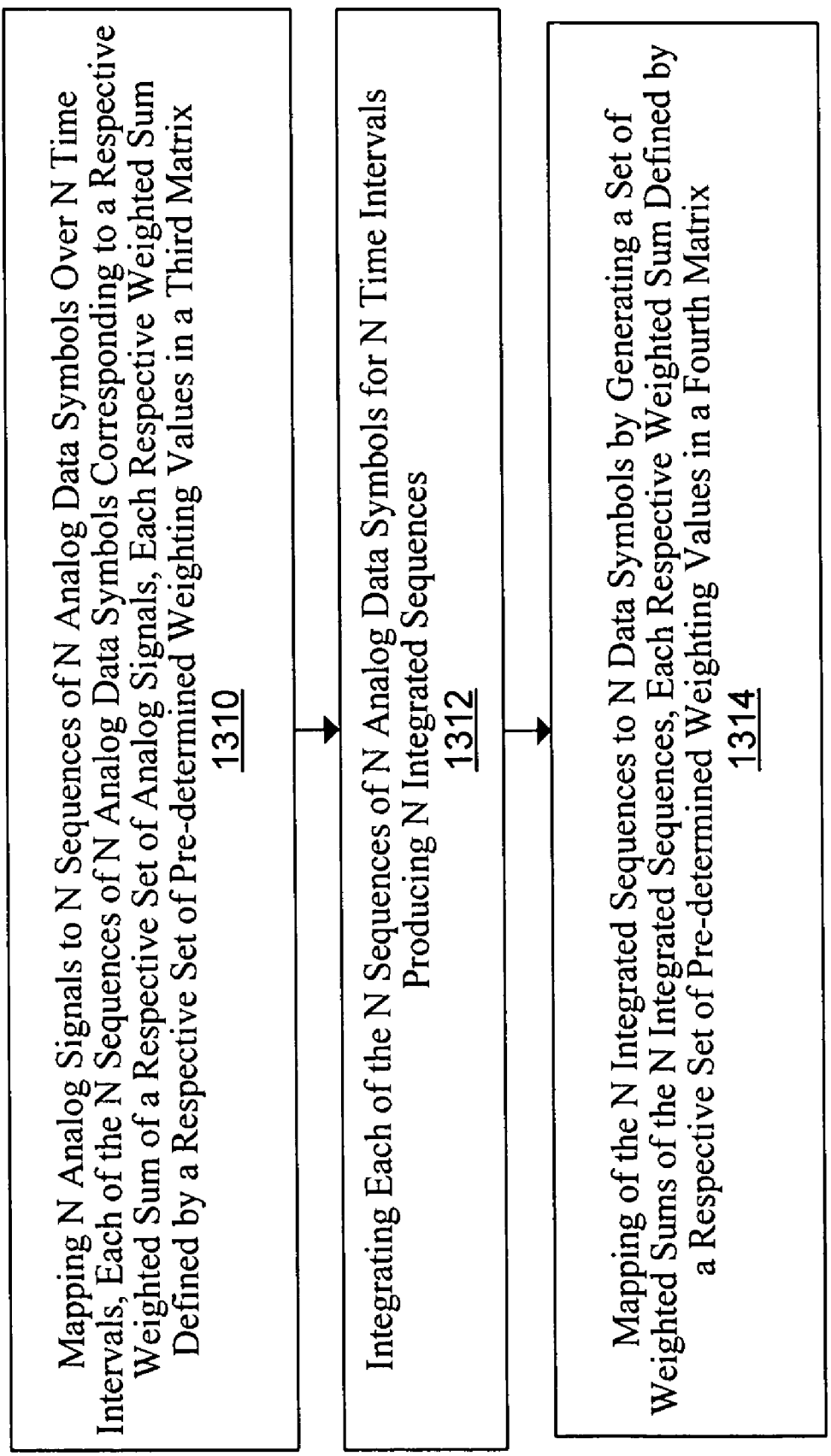
FIG. 13 is a flow diagram illustrating a method of operation of a transform circuit.

FIG. 13 illustrates an embodiment of a method or process for using a transform circuit. N analog signals are mapped to N sequences of N analog data symbols over N time intervals (1310). Each of the N sequences of N analog data symbols corresponds to a respective weighted sum of the respective analog signals. Each respective weighted sum is defined by a respective set of pre-determined weighted values in a third matrix. Each of the N sequences of N analog data symbols is integrated for N time intervals producing N integrated sequences (1312). The N integrated sequences are mapped to N data symbols by generating a set of weighted sums of the N integrated sequences. Each respective weighted sum is defined by a respective set of pre-determined weighted values in a fourth matrix (1314). In some embodiments, there may be fewer or additional operations, an order of the operations may be rearranged and/or two or more operations may be combined.

The transform circuit may be applied in a variety applications, such as image processing as well as communications systems, such as multi-tone systems or links where sub-channels corresponding to bands of frequencies are used to convey information. In some embodiments of a multi-tine system using the transform circuit, respective data streams, such as data stream 210 (FIG. 2A), coupled to instances of the transform circuit 200 (FIG. 2A) correspond to respective sub-channels in the multi-tone system. A communications channel coupled to the transform circuit may correspond to an interconnect or an interface, a bus and/or a back plane. The communications channel may correspond to inter-chip communication, such as between one or more semiconductor chips or dies, or to communication within a semiconductor chip, also known as intra-chip communication, such as between modules in an integrated circuit.

The transform circuit and its methods of operation are well-suited for use in improving communication in memory systems and devices. They are also well-suited for use in improving communication between a memory controller chip and one or more memory devices or modules, such as a dynamic random access memory (DRAM) chip. The DRAM chip may be either on the same printed circuit board as the controller or embedded in a memory module. The apparatus and methods described herein may also be applied to other memory technologies, such as static random access memory (SRAM) and electrically erasable programmable read-only memory (EEPROM).

Devices and circuits described herein can be implemented using computer aided design tools available in the art, and embodied by computer readable files containing software descriptions of such circuits, at behavioral, register transfer, logic component, transistor and layout geometry level descriptions stored on storage media or communicated by carrier waves. Data formats in which such descriptions can be implemented include, but are not limited to, formats supporting behavioral languages like C, formats supporting register transfer level RTL languages like Verilog and VHDL, and formats supporting geometry description languages like GDSII, GDSIII, GDSIV, CIF, MEBES and other suitable formats and languages. Data transfers of such files on machine readable media including carrier waves can be done electronically over the diverse media on the Internet or through email, for example. Physical files can be implemented on machine readable media such as 4 mm magnetic tape, 8 mm magnetic tape, floppy disk media, hard disk media, CDs, DVDs, and so on.

Figure 14:
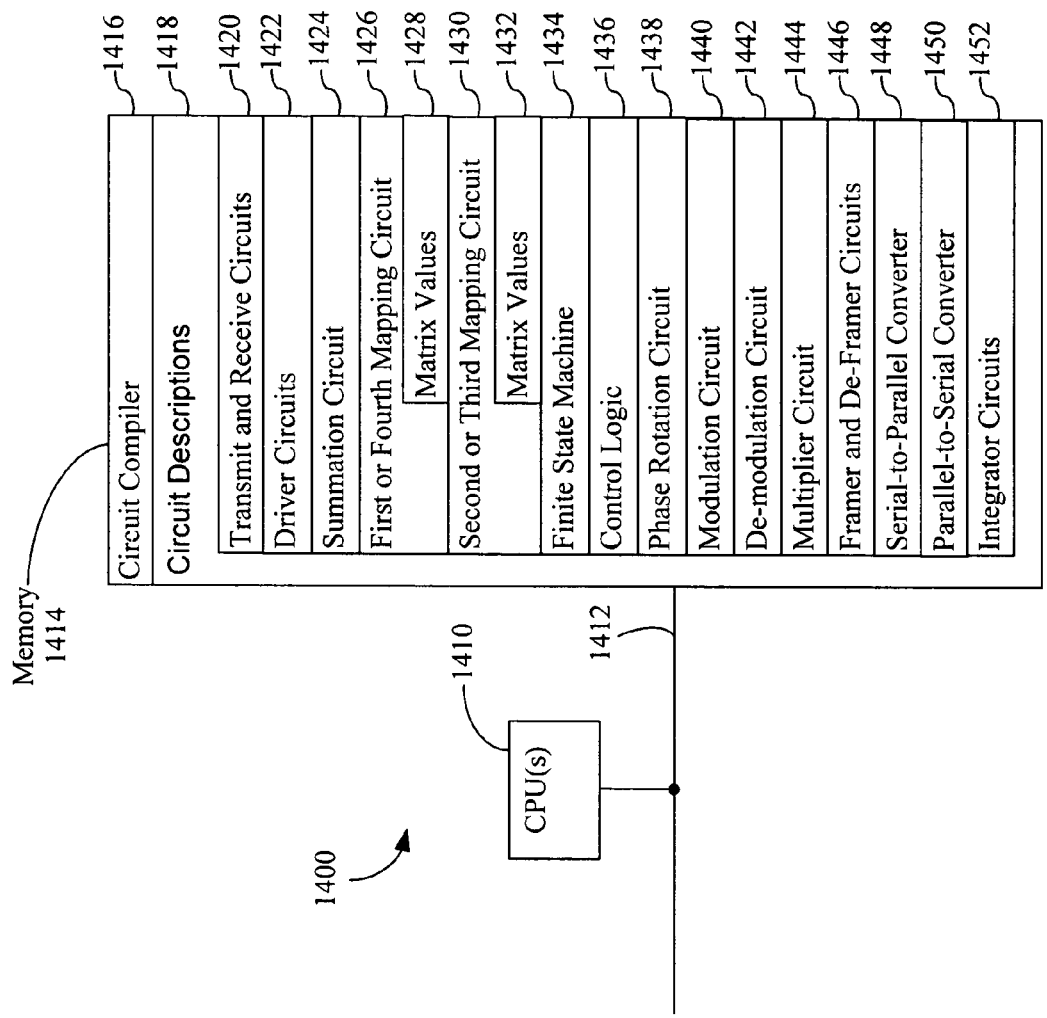
FIG. 14 is a block diagram illustrating an embodiment of a system.

FIG. 14 is a block diagram an embodiment of a system 1400 for storing computer readable files containing software descriptions of the circuits. The system 1400 may include at least one data processor or central processing unit (CPU) 1410, a memory 1414 and one or more signal lines 1412 for coupling these components to one another. The one or more signal lines 1412 may constitute one or more communications busses.

The memory 1414 may include high-speed random access memory and/or non-volatile memory, such as one or more magnetic disk storage devices. The memory 1414 may store a circuit compiler 1416 and circuit descriptions 1418. The circuit descriptions 1418 may include transmit and receive circuits 1420, driver circuits 1422, summation circuit 1424, first or fourth mapping circuit 1426, second or third mapping circuit 1430, finite state machine 1434, control logic 1436, rotation circuit 1438, modulation circuit 1440, de-modulation circuit 1442, multiplier circuit 1444, framer and de-framer circuits 1446, serial-to-parallel converter 1448, parallel-to-serial converter 1450 and integrator circuits 1452. The first or fourth mapping circuit 1426 may include matrix or gain values 1428 and the second or third mapping circuit 1430 may include matrix or gain values 1432. The circuit descriptions 1418 may include descriptions of additional circuits, and in some embodiments may include only a subset of the circuit descriptions shown in FIG. 14. For instance, some embodiments may not include a phase rotation circuit 1438, and some embodiments many not include framer and de-framer circuits 1446, or serial-to-parallel and parallel-to-serial circuits 1448, 1450, or a summation circuit 1424 (or the summation circuit 1424 may be implemented by a simple summation node, requiring no circuit elements other than connection lines). Exemplary additional circuits that may be included in some embodiments are sample and hold circuits, for example for use at the output of the first stage circuit 216 (FIG. 2A) and at the output of the integrator circuits 254 (FIG. 2B).

The foregoing descriptions of specific embodiments of the present invention are presented for purposes of illustration and description. They are not intended to be exhaustive or to limit the invention to the precise forms disclosed. Rather, it should be appreciated that many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A transform circuit, comprising:
    a first circuit to map a set of N digital data symbols from N parallel data streams to N analog data symbols by generating N sets of first weighted sums of the N digital data symbols, each respective first weighted sum defined by a respective set of pre-determined first weighting values in a first matrix; and a second circuit to map the N analog data symbols to a sequence of N output signals over N time intervals, each of the N output signals corresponding to a respective second weighted sum of the N analog data symbols, each respective second weighted sum defined by a respective set of pre-determined second weighting values in a second matrix;

wherein the first circuit and the second circuit together generate a pre-defined transform of the N digital data symbols.

2. The transform circuit of claim 1, wherein the pre-defined transform is an inverse discrete Fourier transform (IDFT).

3. The transform circuit of claim 1, wherein N is an integer greater than 3.

4. The transform circuit of claim 1, including a serial to parallel converter to process a first data stream to produce the N parallel data streams.

5. The transform circuit of claim 1, wherein the second circuit includes:

multiplier circuitry for multiplying the N analog data symbols by the second matrix of pre-determined second weighting values, including circuitry for multiplying the N analog data symbols by successive respective subsets of the pre-determined second weighting values during N successive time intervals to produce N successive sets of multiplication results; and a summation circuit for combining each successive set of multiplication results from the second circuit to produce a respective output signal during each of the N successive time intervals.

6. The transform circuit of claim 1, wherein a summation of each row in the first matrix equals a first value and a summation of each column in the first matrix equals the first value.

7. The transform circuit of claim 1, wherein the first circuit includes first and second parallel sub-circuits, each sub-circuit including a plurality of fixed gain drivers and connections for coupling a subset of the N digital data symbols to a respective set of the fixed gain drivers thereby multiplying the subset of the N digital data symbols by a corresponding subset of the pre-determined first weighting values in the first matrix.

8. The transform circuit of claim 1, further comprising a finite state machine, wherein the second circuit includes a plurality of fixed gain drivers and a connection matrix controlled by the finite state machine for multiplying the N analog data symbols by respective pre-determined second weighting values associated with the fixed gain drivers.

9. The transform circuit of claim 1, further comprising a finite state machine, wherein the second circuit includes N programmable gain drivers and the finite state machine provides respective pre-determined second weighting values for multiplying the N analog data symbols.

10. The transform circuit of claim 1, further comprising a finite state machine, wherein the first circuit includes a plurality of fixed gain drivers and a connection matrix controlled by the finite state machine for multiplying the N digital data symbols by respective pre-determined first weighting values associated with the fixed gain drivers.

11. The transform circuit of claim 1, further comprising a finite state machine, wherein the first circuit includes N programmable gain drivers and the finite state machine provides respective pre-determined first weighting values for multiplying the N digital data symbols.

12. The transform circuit of claim 1, wherein the digital data symbols are complex, having an in-phase component and an out-of-phase component, and wherein the first circuit uses multiplication in a complex domain to generate first weighted sums of combinations of in-phase components and out-of-phase components of the N digital data symbols and the second circuit uses multiplication in a complex domain to generate second weighted sums of combinations of in-phase components and out-of-phase components of the N analog data symbols.

13. The transform circuit of claim 1, wherein the second matrix includes a plurality of complex values, each having a component, wherein the component is selected from the set consisting of a first set of two distinct values of equal magnitude and a second set of two distinct values of equal magnitude.

14. The transform circuit of claim 1, wherein the second circuit includes a plurality of multipliers, at least one of which modulates the N analog data symbols using a carrier signal having a respective carrier signal frequency.

15. A transform mechanism, comprising:

a first means for mapping a set of N digital data symbols from N parallel data streams to N analog data symbols by generating N sets of first weighted sums of the N digital data symbols, each respective first weighted sum defined by a respective set of pre-determined first weighting values in a first matrix; and a second means for mapping the N analog data symbols to a sequence of N output signals over N time intervals, each of the N output signals corresponding to a respective second weighted sum of the N analog data symbols, each respective second weighted sum defined by a respective set of pre-determined second weighting values in a second matrix, wherein the first means and the second means together generate a pre-defined transform of the N digital data symbols.

16. A method of transforming data, comprising:

mapping a set of N digital data symbols from N parallel data streams to N analog data symbols by generating N sets of first weighted sums of the N digital data symbols, each respective first weighted sum defined by a respective set of pre-determined first weighting values in a first matrix; and mapping the N analog data symbols to a sequence of N output signals over N time intervals, each of the N output signals corresponding to a respective second weighted sum of the N analog data symbols, each respective second weighted sum defined by a respective set of pre-determined second weighting values in a second matrix, wherein the mappings together generate a pre-defined transform of the N digital data symbols.

17. A transform circuit, comprising:

a first circuit to map N analog signals to N sequences of N analog data symbols over N time intervals, each of the N sequences of N analog data symbols corresponding to a respective first weighted sum of a respective set of analog signals, each respective first weighted sum defined by a respective set of pre-determined first weighting values in a first matrix;

an integration circuit to integrate each of the N sequences of N analog data symbols for N time intervals producing N integrated sequences; and a second circuit to map the N integrated sequences to N digital data symbols by generating a set of second weighted sums of the N integrated sequences, each respective second weighted sum defined by a respective set of pre-determined second weighting values in a second matrix, wherein the first circuit and the second circuit together generate a pre-defined transform of the N analog signals.

18. A transform mechanism, comprising:

a first means for mapping N analog signals to N sequences of N analog data symbols over N time intervals, each of the N sequences of N analog data symbols corresponding to a respective first weighted sum of a respective set of analog signals, each respective first weighted sum defined by a respective set of pre-determined first weighting values in a first matrix;

an integration means for integrating each of the N sequences of N analog data symbols for N time intervals producing N integrated sequences; and a second means for mapping the N integrated sequences to N digital data symbols by generating a set of second weighted sums of the N integrated sequences, each respective second weighted sum defined by a respective set of pre-determined second weighting values in a second matrix, wherein the first means and the second means together generate a pre-defined transform of the N analog signals.

19. A method of transforming data, comprising:

mapping N analog signals to N sequences of N analog data symbols over N time intervals, each of the N sequences of N analog data symbols corresponding to a respective first weighted sum of a respective set of analog signals, each respective first weighted sum defined by a respective set of pre-determined first weighting values in a first matrix;

integrating each of the N sequences of N analog data symbols for N time intervals producing N integrated sequences; and mapping the N integrated sequences to N digital data symbols by generating a set of second weighted sums of the N integrated sequences, each respective second weighted sum defined by a respective set of pre-determined second weighting values in a second matrix;

wherein the mappings together generate a pre-defined transform of the N analog signals.

20. A computer readable medium containing data that describes a transform circuit, wherein the transform circuit comprises:

a first circuit to map a set of N digital data symbols from N parallel data streams to N analog data symbols by generating N sets of first weighted sums of the N digital data symbols, each respective first weighted sum defined by a respective set of pre-determined first weighting values in a first matrix; and a second circuit to map the N analog data symbols to a sequence of N output signals over N time intervals, each of the N output signals corresponding to a respective second weighted sum of the N analog data symbols, each respective second weighted sum defined by a respective set of pre-determined second weighting values in a second matrix, wherein the first circuit and the second together generate a pre-defined transform of the N digital data symbols.

21. A computer readable medium containing data that describes a transform circuit, wherein the transform circuit comprises:

a first circuit to map N analog signals to N sequences of N analog data symbols over N time intervals, each of the N sequences of N analog data symbols corresponding to a respective first weighted sum of a respective set of analog signals, each respective first weighted sum defined by a respective set of pre-determined first weighting values in a first matrix;

an integration circuit to integrate each of the N sequences of N analog data symbols for N time intervals producing N integrated sequences; and a second circuit to map the N integrated sequences to N digital data symbols by generating a set of second weighted sums of the N integrated sequences, each respective second weighted sum defined by a respective set of pre-determined second weighting values in a second matrix, wherein the transform circuit generates a pre-defined transform of the N analog signals.

* * * * *